*US008983971B2*

United States Patent
Hu et al.

(10) Patent No.: US 8,983,971 B2
(45) Date of Patent: Mar. 17, 2015

(54) METHOD, APPARATUS, AND SYSTEM FOR MOBILE SEARCH

(75) Inventors: Hanqiang Hu, Shenzhen (CN); Jiachun Du, Shenzhen (CN); Chong Gu, Shenzhen (CN); Jiangtao Jia, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 166 days.

(21) Appl. No.: 13/464,391

(22) Filed: May 4, 2012

(65) Prior Publication Data

US 2012/0221544 A1    Aug. 30, 2012

Related U.S. Application Data

(63) Continuation of application No. PCT/CN2010/077773, filed on Oct. 15, 2010.

(30) Foreign Application Priority Data

Nov. 6, 2009    (CN) .......................... 2009 1 0220810

(51) Int. Cl.
*G06F 17/30* (2006.01)
*G06Q 30/02* (2012.01)

(52) U.S. Cl.
CPC .......... *G06Q 30/02* (2013.01); *G06F 17/30867* (2013.01)
USPC ...................................... 707/748

(58) Field of Classification Search
USPC ................... 707/749, 750, 751, 752, 753, 758
See application file for complete search history.

(56) References Cited

U.S. PATENT DOCUMENTS 7,395,259 B2    7/2008    Bailey et al.
2003/0195877 A1*    10/2003    Ford et al. .................... 707/3
2005/0234879 A1*    10/2005    Zeng et al. .................... 707/3
2007/0067305 A1*    3/2007    Ives .............................. 707/10

FOREIGN PATENT DOCUMENTS

CN    101140582 A    3/2008
CN    101317176 A    12/2008

OTHER PUBLICATIONS

International Search Report and Written Opinion of the International Searching Authority issued in corresponding PCT Patent Application No. PCT/CN2010/077773, mailed Jan. 27, 2011.
Open Mobile Alliance, "Mobile Search Framework Requirements" Candidate Version, 1.0, OMA-RD-MSrchFramework-V1_0-20090811-C, Aug. 11, 2009.
Open Mobile Alliance, "Mobile Search Framework" Draft Version 1.0. OMA-TS-MSrchFramework-V1_0-20091110-D, Nov. 10, 2009.
Written Opinion of the International Search Report issued in corresponding PCT Application No. PCT/CN2010/077773 (including English Translation); mailed Jan. 27, 2011.
English translated claims from corresponding PCT Application No. PCT/CN2010/077773 (including Verification of Translation).

* cited by examiner

*Primary Examiner* — James Trujillo
*Assistant Examiner* — Fatima Mina
(74) *Attorney, Agent, or Firm* — Huawei Technologies Co., Ltd.

(57) ABSTRACT

A method, an apparatus, and a system for mobile search are provided. The method for mobile search includes: receiving a search request, where the search request carries keyword information to be searched for, and an instant interest model and a long-term interest model acquired by a search application server; calculating a relevance score value of each member engine according to the search request, meta index information of the member engine, the instant interest model, and the long-term interest model; and selecting one or more member engines according to the relevance score value to search for the keyword information. The searching for the keyword information may integrate an instant interest model and a long-term interest model of a user, so as to provide users with personalized and highly accurate search result information that meets demands.

6 Claims, 8 Drawing Sheets

METHOD, APPARATUS, AND SYSTEM FOR MOBILE SEARCH

CROSS-REFERENCE TO RELATED APPLICATIONS

This application is a continuation of International Application No. PCT/CN2010/077773, filed on Oct. 15, 2010, which claims priority to Chinese Patent Application No. 200910220810.7, filed on Nov. 6, 2009, both of which are hereby incorporated by reference in their entireties.

FIELD OF THE INVENTION

The present invention relates to the field of communications technologies, and in particular, to a method, an apparatus, and a system for mobile search.

BACKGROUND OF THE INVENTION

With the continuous development of value-added services, mobile search services develop rapidly accordingly. One of very important technical highlights of mobile search is accurate search. That is, a personalized and highly accurate search service is required to be provided for a user. A mobile search frame is a platform based on Meta search, and the platform integrates capability of many specialized/vertical search engines to provide users with new and comprehensive search capability.

In the prior art, an Open Mobile Alliance (OMA) mobile search frame includes: a search application server, a search server, a search client, and a data source. When mobile search is performed, the search client sends a search request to the search application server. The search application server extracts context information, performs query classification, and sends the search request to the search server. The search serer distributes the search request to member engines. After completing searching, the member engines feed back search results to the search server. The search server feeds back the search results to the search application server. Finally, the search application server returns a final search result to the search client.

During the implementation of the present invention, the inventors find that the prior art at least has the following problems. Due to a low degree of personalization, the existing mobile search based on an OMA mobile search frame cannot meet the search accuracy required by users.

SUMMARY OF THE INVENTION

Embodiments of the present invention provide a method, an apparatus, and a system for mobile search.

An embodiment of the present invention provides a method for mobile search, where the method includes:

receiving a search request, where the search request carries keyword information to be searched for, and an instant interest model and a long-term interest model acquired by a search application server;

calculating a relevance score value of each member engine according to the search request, meta index information of the member engine, the instant interest model, and the long-term interest model; and selecting one or more member engines according to the relevance score value to search for the keyword information.

An embodiment of the present invention further provides a method for mobile search, where the method includes:

sending a search request to one or more member engines, where the search request carries keyword information to be searched for, and an instant interest model and a long-term interest model acquired by a search application server;

receiving search result information acquired, according to the keyword information, the instant interest model, and the long-term interest model, by the one or more member engines and score information corresponding to the search result information; and re-scoring and sorting the search result information according to the score information and information of relevant factors, acquiring the search result information after re-scoring and sorting, and sending the search result information after re-scoring and sorting to the search application server.

An embodiment of the present invention further provides a method for mobile search, where the method includes:

receiving a search request, where the search request carries an instant interest model and a long-term interest model;

performing searching according to the search request to acquire search result information, and performing scoring and sorting processing on the search result information according to the instant interest model and the long-term interest model; and returning the search result information after the scoring and sorting processing.

An embodiment of the present invention provides a search server, where the search server includes:

a first receiving module, configured to receive a search request, where the search request carries keyword information to be searched for, and an instant interest model and a long-term interest model acquired by a search application server;

a first processing module, configured to calculate a relevance score value of each member engine according to the search request, meta index information of the member engine, the instant interest model, and the long-term interest model; and a first search module, configured to select, according to the relevance score value, one or more member engines to search for the keyword information.

An embodiment of the present invention further provides a search server, where the search server includes:

a second sending module, configured to send a search request to one or more member engines, where the search request carries keyword information to be searched for, and an instant interest model and a long-term interest model acquired by a search application server;

a second receiving module, configured to receive search result information acquired, according to the keyword information, the instant interest model, and the long-term interest model, by the one or more member engines and score information corresponding to the search result information; and a second processing module, configured to re-score and sort the search result information according to the score information and information of relevant factors, acquire the search result information after re-scoring and sorting, and send the search result information after re-scoring and sorting to the search application server through the second sending module.

An embodiment of the present invention provides a member engine device, where the member engine device includes:

a fourth receiving module, configured to receive a search request, where the search request carries keyword information to be searched for, an instant interest model, and a long-term interest model;

a fourth processing module, configured to search for the keyword information according to the search request to acquire search result information, and perform scoring and sorting processing on the search result information according to the instant interest model and the long-term interest model; and a fourth sending module, configured to return the search result information after the scoring and sorting processing.

According to embodiments of the present invention, the searching for the keyword information may integrate an instant interest model and a long-term interest model of a user, so as to provide users with personalized and highly accurate search result information that meets demands.

BRIEF DESCRIPTION OF THE DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are only some embodiments of the present invention, and persons of ordinary skill in the art can derive other drawings from the accompanying drawings without creative efforts.

DETAILED DESCRIPTION OF THE EMBODIMENTS

In order to make the objectives, technical solutions, and advantages according to embodiments of the present invention clearer, the technical solutions according to the embodiments of the present invention will be clearly and completely described in the following with reference to the accompanying drawings. It is obvious that the embodiments to be described are only a part rather than all of the embodiments of the present invention. All other embodiments obtained by persons of ordinary skill in the art based on the embodiments of the present invention without creative efforts shall fall within the protection scope of the present invention.

Figure 1:
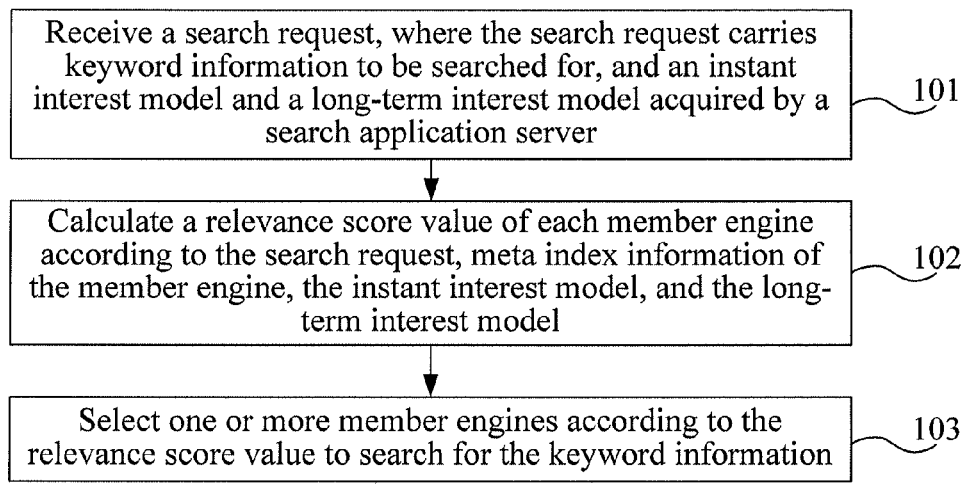
FIG. 1 is a flow chart of Embodiment 1 of a method for mobile search according to the present invention.

FIG. 1 is a flow chart of Embodiment 1 of a method for mobile search according to the present invention. As shown in FIG. 1, the method according to this embodiment may include the following steps.

Step 101: Receive a search request, where the search request carries keyword information to be searched for, and an instant interest model and a long-term interest model acquired by a search application server.

For example, the search application server may acquire the instant interest model and the long-term interest model of a user from a user database according to a search request message sent by a search client. For example, the long-term interest model of the user is extracted from information in the user database such as information of a static profile and search history of the user, or the long-term interest model pre-stored in the user database is directly extracted. In addition, the search application server may also extract the instant interest model of the user from relevant data of a query sequence $q(1), \ldots, q(t-1), q(t)$ in the same search context session of a current query $q(t)$. The search context session is a period of preset time before the current query $q(t)$ occurs, for example, half an hour, plus the time when the current query $q(t)$ occurs. After extracting the instant interest model and the long-term interest model, the search application server may send the search request to a search server, so that the search server may search for keyword information to be searched for according to the instant interest model and the long-term interest model of the user carried in the search request.

The interest model of the user may be represented in n dimensions, such as, news, sports, entertainment, finance and economics, science and technology, real estate, games, female, forum, weather, commodity, home appliance, music, books, blog, mobile phone, military, education, travel, multimedia message, color ring back tone, dining, civil aviation, industry, agriculture, computer, and geography. A vector $W(r1, r2, r3, \ldots, rn)$ formed by score values of interest dimensions of the user is the interest model of the user.

If a score value ri of each dimension of the interest model $W(r1, r2, r3, \ldots, rn)$ is calculated according to all search history data of the user and the static profile of the user, the interest model $W(r1, r2, r3, \ldots, rn)$ is the long-term interest model of the user. If the score value ri of each dimension of the interest model $W(r1, r2, r3, \ldots, rn)$ is calculated according to the relevant data of the query sequence $q(1), \ldots, q(t-1), q(t)$ in the same search context session of the current query $q(t)$, $W(r1, r2, r3, \ldots, rn)$ is the instant interest model of the user. It should be noted that in this embodiment of the present invention, the query $q(t)$ corresponds to the search request, that is, each search request has a query $q(t)$.

Step 102: Calculate a relevance score value of each member engine according to the search request, meta index information of the member engine, the instant interest model, and the long-term interest model.

The member engine is a server configured to search for the keyword information. The member engine may report the meta index information thereof to the search server. Specifically, the meta index information of the member engine is statistical data on a database and a sub-database corresponding to the member engine, documents or records included in the database or the sub-database, and terms included in the documents or the records.

The meta index information may include one of or any combination of the following information:

a term maximum normalization weight vector mnw=(mnw1, mnw2, ..., mnwi, ..., mnwp), where mnwi is a maximum normalization weight of a term ti with respect to all documents in the database or the sub-database corresponding to the member engine;

a term average normalization weight vector anw=(anw1, anw2, ..., anwi, ..., anwp), where anwi is an average normalization weight of the term ti with respect to all documents in the database or the sub-database corresponding to the member engine;

an interest model maximum normalization weight vector mnv=(mnv1, mnv2, ..., mnvi, ..., mnvn) of a document in the database or the sub-database, where mnvi is a maximum normalization weight of an $i^{th}$ dimension of the interest model of the document with respect to all documents in the database or the sub-database corresponding to the member engine;

an interest model average normalization weight vector anv=(anv1, anv2, ..., anvi, ..., anvn) of a document in the database or the sub-database, where anvi is an average normalization weight of the $i^{th}$ dimension of the interest model of the document with respect to all documents in the database or the sub-database corresponding to the member engine;

a global inverse document frequency gidfi of the term ti with respect to the database, where gidfi=1/dfi, and dfi is a count of the documents including the term ti in the database corresponding to the meta index;

a global inverse document frequency IM_gidfi corresponding to the $i^{th}$ dimension of the interest model of the documents, where IM_gidfi=1/IM_IDFi, and IM_IDFi is a count of documents including the term belonging to the $i^{th}$ dimension of the interest model of the documents in the database or the sub-database;

a global inverse document frequency gidfi=log(n/(gdfi+1)) of the term ti with respect to the database, where gdfi is a sum of documents including the term ti in databases or sub-databases corresponding to all member engines, and n is a sum of all documents included by all of the member engines; and a global inverse document frequency IM_gidfi=log(n/(IM_gdfi+1)) corresponding to the $i^{th}$ dimension of the interest model of the documents, where IM_gdfi is a sum of documents including the term belonging to the dimension of the interest model of the documents in the databases or the sub-databases corresponding to all of the member engines, and n is the sum of the number of all of the documents included in all of the member engines.

The search server may acquire selection result information of each of the member engines according to the meta index information reported by the member engine, the instant interest model, and the long-term interest model. For example, the search server may perform matching processing between the meta index information and the instant interest model, the long-term interest model, and a query request respectively, and a matching member engine is selected as a member engine used to search for keyword information subsequently. The selection result information may be Identification (ID) information of the selected member engine. The selected member engine may well match the long-term interest, the instant interest of the user, and the keyword information to be searched for, so that the search server may deliver a keyword to be searched for to the selected member engine to search, so as to acquire accurate search result information.

Step 103: Select one or more member engines according to the relevance score value to search for the keyword information.

After selecting the member engine to be used from the member engines, the search server may send the search request to the selected member engine.

In this embodiment, before requesting the member engine to search for the keyword information, the search server may select the member engine according to the instant interest model and the long-term interest model of the user, so that the member engine matching the keyword information, the instant interest model, and the long-term interest model can be selected and acquired to search for the keyword information, and the accurate search result information can be acquired, so as to further meet a search demand of the user.

In another embodiment of the method for mobile search of the present invention, the instant interest model may be an instant interest model vector formed by score values of N dimensions. The score value of each of the dimensions is calculated according to the relevant data of the query sequence q(1), ..., q(t−1), q(t) in the same search context session of the current query q(t). The search context session is a period of preset time before the current query q(t) occurs plus the time when the current query q(t) occurs.

Specifically, in this embodiment, a Conditional Random Field (CRF) model may be used to calculate a conditional probability of an output type of the current query q(t) when the query sequence q(1), ... q(t−1), q(t) in the same search context session of the current query q(t) is given. The conditional probability value is used as the score value of the interest dimension of the instant interest model corresponding to the output type.

For example, in this embodiment G=(V,E) may be defined as an undirected graph, and Y={$Y_v$|v∈V}. That is to say, each node in V corresponds to a component $Y_v$ of a flag sequence represented by a random variable. If for G each random value $Y_v$ complies with the Markov property, (X, Y) is a CRF, and when X and all other random variables $Y_{\{u|u \neq v, \{u,v\} \in V\}}$ are given, a probability $P(Y_v|X, Y_u, u \neq v, \{u.v\} \in V)$ of the random variable $Y_v$ equals $P(Y_v|X, Y_u, (u,v) \in E)$.

According to the Markov property and the maximum entropy principle, a CRF classical conditional probability formula may be derived:

when an observation sequence x is given, a conditional probability of a status flag sequence y of the observation sequence satisfies:

$$P_\theta(y|x) = \frac{1}{Z(x)} \exp\left(\sum_{e \in E, k} \lambda_k f_k(e, y|_e, x) + \sum_{v \in V, k} u_k g_k(v, y|_v, x)\right)$$

where x is the observation sequence, y is the flag status sequence, $y|_S$ a set of components of the sequence y associated with a vertex of a subgraph S, f and g are characteristic functions, λ, μ are weight values of the characteristic functions, and Z(x) is a normalization factor.

When the query sequence q=q1, ..., q(T−1), q(T) in the same session is given, a conditional probability of a type sequence C=$c_1$, ... $c_{T-1}$, $c_T$ corresponding to the query sequence is output:

a value space of $c_i$ is $|C|$, $c_0$=start, $c_{T+1}$=end, status of start and end are added to $|C|$ $$p(c|q) = \frac{1}{Z(q)} \prod_{t=1}^{T+1} M_t(c_{t-1}, c_t | q),$$

where:

$$Z(q) = \sum_c \prod_{t=1}^{T+1} M_t(c_{t-1}, c_t | q),$$

and is a normalization factor.

$$M_t(c_{t-1}, c_t | q) = \exp\left(\sum_k \lambda_k f_k(c_{t-1}, c_t, q) + \sum_k u_k g_k(c_t, q)\right)$$

A matrix of $|C| \times |C|$ is defined:

$$M_t(q) = [M_t(c_{t-1}, c_t | q)]$$

then $Z(q)$ equals an item (start, end) of the matrix $M_1(q) * \ldots M_T(q) * M_{T+1}(q)$.

$$Z(q) = \sum_c \prod_{t=1}^{T+1} M_t(c_{t-1}, c_t | q)$$

$$= \sum_{startc_1 \ldots c_{T-1} c_T end} \prod_{t=1}^{T+1} M_t(c_{t-1}, c_t | q)$$

$$= \left(\prod_{t=1}^{T+1} M_t(q)\right)_{start,end}$$

$$\theta = (\lambda_1, \lambda_2, \ldots; u_1, u_2, \ldots)$$

determination of the parameter $\theta$:
training data $D = \{(q^{(i)}, c^{(i)})\}_{i=1}^N$ and an empirical distribution $\tilde{p}(q,c)$ are given, a log-likelihood function of the training data is:

$$L(\theta) = \sum_{i=1}^N \log P_\theta(c^{(i)} | q^{(1)}) \propto \sum_{q,c} \tilde{p}(q, c) \log(p_\theta(c | q))$$

θth at making $L(\theta)$ achieve a maximum value is calculated.
In this embodiment, θ may be calculated by using a General Iterative Scaling (GIS) algorithm:
(a) Calculation of $Ef_k$ and $Eg_k$:

$$EF_k = \sum_{q,c} p_\theta(q, c) f_k(q, c)$$

$$= \sum_{q,c} p_\theta(q) p_\theta(c | q) f_k(q, c)$$

$$\approx \sum_{q,c} \tilde{p}(q) p_\theta(c | q) f_k(q, c)$$

$$= \sum_q \tilde{p}(q) \sum_{i=1}^T \sum_{c_{i-1} c_i} (p_\theta(c_{i-1}, c_i | q) f_k(c_{i-1}, c_i, q))$$

-continued $$p_\theta(c_{i-1}, c_i | q) = \sum_{startc_1 \ldots c_{i-2} c_{i+1} \ldots c_T end} p_\theta(startc_1, \ldots, c_T end | q)$$

$$= \frac{1}{Z(q)} \sum_{startc_1 \ldots c_{i-2} c_{i+1} \ldots c_T end} \prod_{t=1}^{T+1} M_t(c_{t-1}, c_t | q)$$

$$= \frac{1}{Z(q)} \left(\sum_{startc_1 \ldots c_{i-2}} \prod_{t=1}^{i-1} M_t(c_{t-1}, c_t | q)\right)$$

$$M_i(c_{i-1}, c_i | q) \left(\sum_{C_{i+1} \ldots C_T end} \prod_{t=i+1}^{T+1} M_t(c_{t-1}, c_t | q)\right)$$

$$= \frac{1}{Z(q)} \left(\left(\prod_{t=1}^{i-1} M_t(q)\right)_{start, c_{i-1}} M_i(c_{i-1}, c_i | q)\right.$$

$$\left.\left(\prod_{t=i+1}^{T+1} M_t(q)\right)_{c_i, end}\right)$$

$$= \frac{1}{Z(q)} \alpha_{i-1}(c_{i-1} | q) M_i(c_{i-1}, c_i | q) \beta_i(c_i | q))$$

where:

$\alpha(q)$ is a vector of $1 \times |C|$, $\alpha_i(q) = \alpha_{i-1} M_i(q)$ if $c_t$ = start, $\alpha_0(c_t | q) = 1$ otherwise, $a_0(c_t | q) = 0$ $\beta(i)$ is a vector of $1 \times |C|$, $\beta(i)^T = M_{i+1}(q) \beta(i+1)^T$ if $c_t$ = end, $\beta_{T+1}(c_t | q) = 1$ otherwise, $\beta_{T+1}(c_t | q) = 0$ $$Eg_k = \sum_{q,c} p_\theta(q, c) g_k(q, c)$$

$$= \sum_{q,c} p_\theta(q) p_\theta(c | q) g_k(q, c)$$

$$\approx \sum_{q,c} \tilde{p}(q) p_\theta(c | q) g_k(q, c)$$

$$= \sum_q \tilde{p}(q) \sum_{i=1}^T \sum_{c_i} p_\theta(c_i | q) g_k(c_i, q)$$

-continued $$p_\theta(c_i \mid q) = \sum_{c_1 \ldots c_{i-1} c_{i+1} \ldots c_T} p_\theta(c_1, \ldots, c_T \mid q)$$

$$= \frac{1}{Z(q)} \sum_{c_1 \ldots c_{i-1} c_{i+1} \ldots c_T} \prod_{t=1}^{T} M_t(c_{t-1}, c_t, q)$$

$$= \frac{1}{Z(q)} \left( \sum_{c_1 \ldots c_{i-1}} \prod_{t=1}^{i} M_t(c_{t-1}, c_t, q) \right)$$

$$\left( \sum_{c_{i+1} \ldots c_T} \prod_{t=i+1}^{T} M_t(c_{t-1}, c_t, q) \right)$$

$$\frac{1}{Z(q)} \left( \left( \prod_{t=1}^{i} M_t(q) \right)_{start, c_i} \left( \prod_{t=i+1}^{T+1} M_t(q) \right)_{c_i, end} \right)$$

$$= \frac{1}{Z(q)} \alpha(i) \beta(i)$$

(b) Calculation of $\tilde{E} f_k$ and $\tilde{E} g_k$:

$$\tilde{E} f_k = \sum_{q,c} \tilde{p}(q,c) f_k(q,c)$$

$$= \sum_{q,c} \tilde{p}(q) \tilde{p}(c \mid q) f_k(q,c)$$

$$= \sum_q \tilde{p}(q) \sum_{i=1}^{T} \sum_{c_{i-1} c_i} \tilde{p}(c_{i-1}, c_i \mid q) f_k(c_{i-1}, c_i, q)$$

$$\tilde{E} g_k = \sum_{q,c} \tilde{p}(q,c) g_k(q,c)$$

$$= \sum_{q,c} \tilde{p}(q) \tilde{p}(c \mid q) g_k(q,c)$$

$$= \sum_q \tilde{p}(q) \sum_{i=1}^{T} \sum_{c_i} \tilde{p}(c_i \mid q) g_k(c_i, q)$$

(c) Iterative calculation of $\lambda_k$ and $u_k$ until $\lambda_k$ and $u_k$ converge:

$$\delta \lambda_k = \frac{1}{S_1} \log \frac{\tilde{E} f_k}{E f_k},$$

where $S_1$ is a constant greater than 1, so that q and c of any values satisfy $$\sum_{k=0}^{n} f_k(q,c) = S_1$$

$$\lambda_{k+1} = \lambda_k + \delta \lambda_k$$

$$\delta u_k = \frac{1}{S_2} \log \frac{\tilde{E} g_k}{E g_k}$$

where $S_2$ is a constant greater than 1, so that q and c of any values satisfy $$\sum_{k=0}^{n} g_k(q,c) = S_2$$

$$u_{k+1} = u_k + \delta u_k$$

Steps (a), (b), and (c) are repeated until $\lambda_k$ and $u_k$ converge.

When the query sequence $q=q1, q(T-1), q(T)$ in the same session is given, a conditional probability of the current query $q(T)$ belonging to the type $C_T$ satisfies:

$$p(c_T \mid q) = \sum_{c_1 \ldots c_{T-1}} p(c \mid q)$$

$$= \frac{1}{Z(q)} \left( \sum_{startc_1 \ldots c_{T-1}} \prod_{t=1}^{T+1} M_t(c_{t-1}, c_t \mid q) \right)$$

$$= \frac{1}{Z(q)} \left( \sum_{startc_1 \ldots c_{T-1}} \prod_{t=1}^{T} M_t(c_{t-1}, c_t \mid q) \right)$$

$$M_{T=1}(c_T, c_{end} \mid q))$$

$$= \frac{1}{Z(q)} \left( \left( \prod_{t=1}^{T} M_t(q) \right)_{start, c_T} M_{T+1}(c_T, c_{end} \mid q) \right)$$

$$= \frac{1}{Z(q)} \alpha_T(c_T \mid q)_{T+1}(c_T, c_{end} \mid q)$$

$p(c_T|q)$ is used as the score value of the dimension of the instant interest model corresponding to the type $C_T$.

Selection of a local characteristic function $g_k$:

(1) A theme word and related words of each field type $c_T$ all are given weights, and the weights of the theme word and the related words form a vector $c_T(t_1, \ldots, t_{n-1}, t_n)$ of a field $c_T$.

Two methods may be used to allocate weights to words in $c_T$.

In one method the weights are allocated manually.

The weights of the words in $c_T$ are given by this way: the theme word is given a maximum weight, strongly related words are given medium weights, and weakly related words are given minimum weights.

For example, the theme word (such as "sichuan cuisine" in a dining field $c_T$) is given a weight of 1, a strongly related word (such as "spicy" in the dining field $c_T$) is given a weight of 0.8, and a weakly related word (such as "delicious" in the dining field $c_T$) is given a weight of 0.5.

In the other method the weights are allocated automatically by learning.

For each field $c_T$, some representative training text corpus data is collected.

Word cutting is performed on a sample corpus to create a thesaurus of the field $c_T$.

A weight of a word in the field $c_T$ is calculated, and the weight=TF×GIDF, where TF is a total word frequency of the word in all corpora of the field $C_T$, GIDF is a global inverse document frequency, GIDF=log(1+N/GDF), where N is the count of all documents of all fields, and GDF is a global document frequency, that is, the count of the documents including the word of all of the fields.

Threshold values, for example, T1, T2, . . . , Tn, of all levels are set, where T1>T2> . . . >Tn.

The words in the thesaurus of the field $c_T$ are divided into sets of multiple levels according to the weights thereof and the threshold values, and the $(i+1)^{th}$ level satisfies Ti>a total word frequency>Ti+1.

Words of each of the levels are given a final score value respectively. Words of the first level are given a largest score value, and words of a medium level are given a medium score value, and words of an $n^{th}$ level are given a smallest score value.

Words in the thesaurus and final score values thereof form a vector of the field $C_T$.

Keywords in the search request are given weights to form a query vector Query (q1, q2, . . . , qn').

(2) The weights of the keywords of query may be given by the following methods.

Method 1: All of the keywords are given a weight of 1.

Method 2: The first keyword is given a maximum weight (for example, the weight of 1), the keyword in the middle is given a medium weight (for example, 0.5<the weight<1), and the last keyword is given a minimum weight (for example, the weight of 0.5).

(3) A cosine similarity between the field vector $c_T$(t1, t2, . . . , tn) and the query vector $q_T$(q1, q2, . . . , qn') is calculated:

$$Sim(q_T(q1, q2, \ldots, qn'),$$
$$c_T(t1, t2, \ldots, tn)) = (q1 \times t1 + q2 \times t2 + \ldots + qn \times tn) /$$
$$\left(\sqrt{q1^2 + q2^2 + \ldots + qn^2} \times \sqrt{t1^2 + t2^2 + \ldots + tn^2}\right)$$

(4) $g_1(c_T, q_T) = sim(q_T, c_T)$;

(5) All user clicked history documents $U_T = \{u_T\}$ of the query q(t) are collected from search history related data, where $u_2$, is a vector of user clicked search result documents corresponding to the query $q_T$. A cosine similarity between $U_T$ and $c_T$ is calculated:

$$sim(c_T(t1, t2, \ldots, tn),$$
$$u_T(u1, u2, \ldots, un)) = (u1 \times t1 + u2 \times t2 + \ldots + un \times tn) /$$
$$\left(\sqrt{u1^2 + u2^2 + \ldots + un^2} \times \sqrt{t1^2 + t2^2 + \ldots + tn^2}\right)$$

$$(6) \quad g_2(c_T, q_T) = \frac{\sum_{u_T} sim(c_T, u_T)}{|U_T|}$$

Selection of a context related characteristic function $f_k$:

(1) Direct Association

A flag sequence pair of a query sequence pair $(q_{t-1}, q_t)$ is set to be $(c_{t-1}, c_t)$. In this embodiment, $f(c_{t-1}, c_t, q)$ is calculated according to the number of occurrence of the flag sequence pair $(c_{t-1}, c_t)$ when the query sequence pair $(q_{t-1}, q_t)$ is given $$f_1(c_{t-1}, c_t, q) = \frac{O(c_{t-1}, c_t)}{O(q_{t-1}, q_t)}$$

where $O(c_{t-1}, c_t)$ is the number of occurrence of the flag sequence pair when the query sequence pair $(q_{t-1}, q_t)$ is given.

$O(q_{t-1}, q_t)$ is a total number of occurrence of the query sequence pair $(q_{t-1}, q_t)$.

(2) Indirect Association by Using a Classification Directory Tree

Assume that the flag sequence pair $(c_{t-1}, c_t)$ is at an $n^{th}$ level of a classification directory tree, a set of ancestor node pairs of $(c_{t-1}, c_t)$ is $\{(a_{c_{t-1}}^{(i)}, a_{c_t}^{(i)})\}, 1 \leq i \leq n-1$. In this embodiment, $f_2(c_{t-1}, c_t, q)$ is calculated according to the number of occurrence of the ancestor node pair $(a_{c_{t-1}}^{(i)}, a_{c_t}^{(i)})$ of $(c_{t-1}, c_t)$ when the query sequence pair $(q_{t-1}, q_t)$ is given.

$$f_2(c_{t-1}, c_t, q) = \frac{\sum_{i=1}^{n-1} O(a_{c_{t-1}}^{(i)}, a_{c_t}^{(i)})}{O(q_{t-1}, q_t)}$$

where $O(a_{c_{t-1}}^{(i)}, a_{c_t}^{(i)})$ is the number of occurrence of the ancestor node pair $(a_{c_{t-1}}^{(i)}, a_{c_t}^{(i)})$ of $(c_{t-1}, c_t)$ when the query sequence pair $(q_{t-1}, q_t)$ is given, and $O(q_{t-1}, q_t)$ is the total number of occurrence of the query sequence pair $(q_{t-1}, q_t)$.

Furthermore, step 102 shown in FIG. 1 may include: calculating a first maximum similarity between the keyword information and the meta index information of the member engine; calculating a second maximum similarity between the meta index information of the member engine and the instant interest model based on that a similarity between the meta index information of the member engine and the keyword information is greater than a first threshold value and a similarity between the meta index information of the member engine and the long-term interest model is greater than a second threshold value; calculating a third maximum similarity between the meta index information of the member engine and the long-term interest model based on that the similarity between the meta index information of the member engine and the keyword information is greater than a third threshold value and a similarity between the meta index information of the member engine and the instant interest model is greater than a fourth threshold value; calculating a fourth maximum similarity between the meta index information of the member engine and a resulting vector of a weighted sum of the long-term interest model and the instant interest model based on that the similarity between the meta index information of the member engine and the keyword information is greater than a fifth threshold value; and calculating a similarity score value of the member engine according to the first maximum similarity, the second maximum similarity, the third maximum similarity, and the fourth maximum similarity.

It should be noted that the first threshold value, the second threshold value, the third threshold value, the fourth threshold value, and the fifth threshold value range from 0 to 1, and persons of ordinary skill in the art may set the threshold values or adopt experiential values as required.

Specifically, the acquiring the selection result information includes the following steps.

Assume that the database corresponding to the member engine is D, a current query vector of the user is $Q(q_1, \ldots, q_{k-1}, q_k)$, the instant interest model vector of the user is IIM $(u_1, \ldots u_{n-1}, u_n)$, and the long-term interest model vector of the user is LIM$(r_1, \ldots r_{n-1}, r_n)$.

Step (a): Calculate a maximum similarity between Q and D, that is, the first maximum similarity $sim_1$.

$$sim_1 = \max_{1 \leq i \leq k}\left(\left(q_i^* gidf_i^* mnw_i + \sum_{j=1, j\neq i}^{k} q_j^* gidf_j^* anw_j\right) \middle/ |Q| + \sum_{j=1}^{n} (r_j + u_j)^* anvj / |R|\right),$$

where |Q| is a norm of the search request vector Q, and |R| is a norm of an interest model R of the user. $sim_1$ is used as the first maximum similarity.

Step (b): Calculate the second maximum similarity $sim_2$ between D and IIM based on that matching is achieved between D and Q and between D and LIM respectively.

$$sim_2 = \underset{1 \leq i \leq n}{\text{Max}} \bigg( \text{if } (sim(V(mnv_i, anv_j(j \neq i, 1 \leq j \leq n)), Q') > T_1$$

and $sim(V(mnv_i, anv_j(j \neq i, 1 \leq j \leq n))$, $LIM(r_1, \ldots r_{n-1}, r_n)) > T_2)$, then $$\left( \left( u_i^* mnv_i + \sum_{j=1, j \neq i}^{n} u_j^* anv_j \right) \bigg/ |R| + \sum_{i=1}^{k} q_i^* gidf_i^* anw_i / |Q| \right)$$

where a method for calculating Q' is: if the term ti belongs to a range of a dimension of the interest model of the user, a value of qi is mapped into a weight of the dimension of the interest model of the user, qi' is acquired by acquiring a sum of weights of the same dimension, and normalization processing is performed; V is a vector formed by mnvi and anvj(j≠i, 1≤j≤n); sim(V(mnvi,anvj(j≠i,1≤j≤n)),Q') is a cosine similarity between the vector V and the vector Q'; sim(V(mnv_i,anv_j (j≠i,1≤j≤n)),LIM(r_1, . . . r_{n-1},r_n)) is a cosine similarity between the vector V and the vector LIM; $T_1, T_2$ are threshold values, and $0 < T_1, T_2 \leq 1$; and i, k, j, and n are natural numbers.

Step (c): Calculate the third maximum similarity $sim_3$ between D and LIM based on that matching is achieved between D and Q and between D and IIM respectively.

$$sim_3 = \underset{1 \leq i \leq n}{\text{Max}} \bigg( \text{if } (sim(V(mnv_i, anv_j(j \neq i, 1 \leq j \leq n)), Q') > T_1$$

and $sim(V(mnv_i, anv_j(j \neq i, 1 \leq j \leq n))$, $IIM(u_1, \ldots u_{n-1}, u_n)) > T_2)$, then $$\left( \left( r_i^* mnv_i + \sum_{j=1, j \neq i}^{n} r_j^* anv_j \right) \bigg/ |R| + \sum_{i=1}^{k} q_i^* gidf_i^* anw_i / |Q| \right)$$

where, a method for calculating Q' is: if the term ti belongs to a range of a dimension of the interest model of the user, a value of qi is mapped into a weight of the dimension of the interest model of the user, and qi' is acquired by acquiring a sum of weights of the same dimension, and normalization processing is performed; V is a vector formed by mnvi and anvj(j≠i,1≤j≤n); sim(V(mnvi,anvj(j≠i,1≤j≤n)),Q') is a cosine similarity between the vector V and the vector Q'; sim(V (mnv_i,anv_j(j≠i,1≤j≤n)), IIM(u_1, . . . u_{n-1},u_n)) is a cosine similarity between the vector V and the vector IIM; $T_1, T_2$ are threshold values, and $0 < T_1, T_2 \leq 1$; and i, k, j, and n are natural numbers.

Step (d): Calculate the fourth maximum similarity $sim_4$ between D and a resulting vector of a weighted sum of IIM and LIM based on that matching is achieved between D and Q.

If $IM(p_1, \ldots, p_{n-1}, p_n) = r'_1 LIM(r_1, \ldots, r_n) + r'_2 IIM(u_1, \ldots, u_{n-1}, u_n)$, $r'_1 + r'_2 = 1$, $$sim_4 = \underset{1 \leq i \leq n}{\text{Max}} \bigg( \text{if } (sim(V(mnv_i, anv_j(j \neq i, 1 \leq j \leq n)), Q') > T_1),$$

then $$\left( \left( p_i^* mnv_i + \sum_{j=1, j \neq i}^{n} p_j^* anv_j \right) \bigg/ |R| + \sum_{i=1}^{k} q_i^* gidf_i^* anw_i / |Q| \right)$$

Step (e): Calculate a similarity score value Msim of the member engine according to sim1 to sim4.

Method 1: A maximum value among sim1, sim2, sim3, and sim4 is acquired.

Msim=Max{sim1, sim2, sim3, sim4}

Method 2: A weighted sum of sim1, sim2, sim3, and sim4 is acquired.

Msim=r1×sim1+r2×sim2+r3×sim3+r4×sim4, where ri+r2+r3+r4=1.

Method 3: A value of product of sim1, sim2, sim3, and sim4 is acquired.

Msim=sim1×sim2×sim3×sim4

In addition to the methods for calculating the relevance score value of the member engine, other relevant factors may further be taken into consideration, for example, a performance factor of the member engine and a price factor of the member engine. A final integrated relevance score value of the member engine is a weighted sum based on the meta index similarity score value (Msim), a performance factor score value, and a price factor score value:

Integrated_Sim=r1×Msim+r2×performance factor score value+r3×price factor score value, where r1+r2+r3=1.

For each of the member engines, the steps (a) to (e) may be adopted for operation, so that a maximum score value of each of the member engines can be acquired.

When selecting a member engine to search for the keyword information, first one or more maximum score values may be selected from a set of the maximum score values as required, that is, one or more member engines are selected, so that the search server may distribute the search request to the selected member engine to perform the search operation. During specific implementation, ID information of the selected member engine may be acquired and used as the selection result information, so that the search request is sent to the member engine corresponding to the ID information.

The technical solution according to the aforementioned embodiment of the method for mobile search according to the present invention is described below in detail through a specific embodiment.

Figure 2:
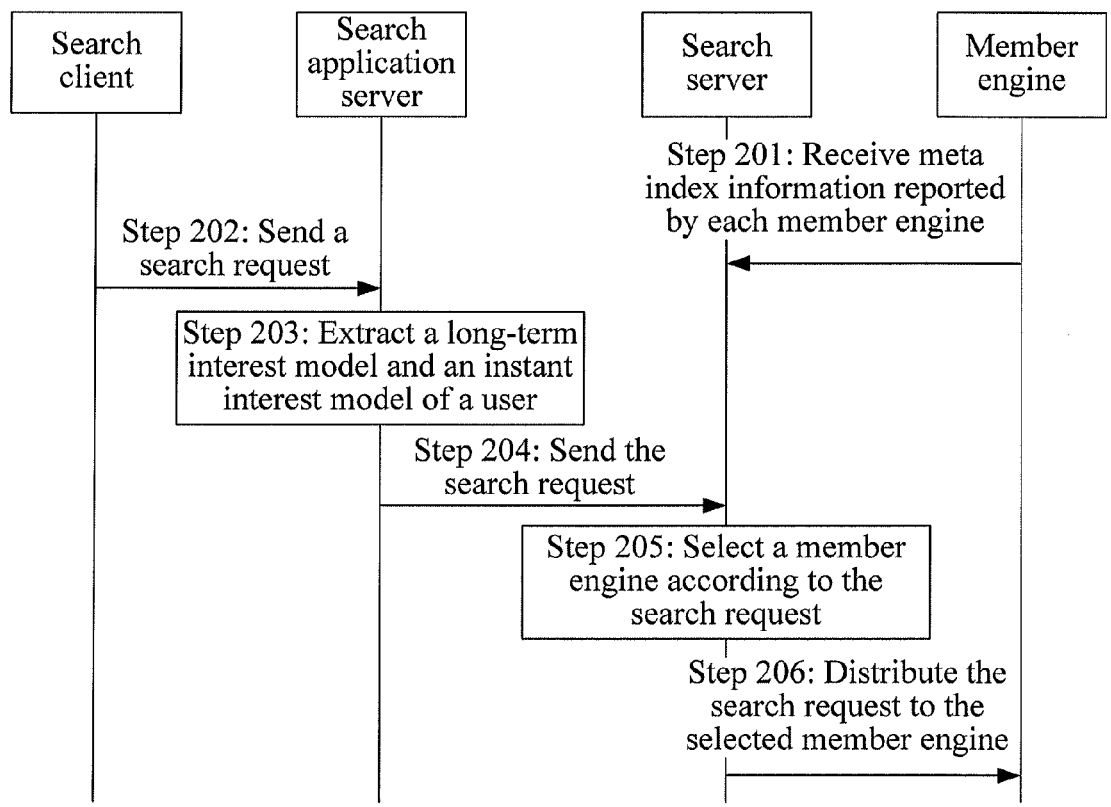
FIG. 2 is a signaling flow chart of Embodiment 2 of a method for mobile search according to the present invention.

FIG. 2 is a signaling flow chart of Embodiment 2 of a method for mobile search according to the present invention. As shown in FIG. 2, the method according to this embodiment may include the following steps.

Step 201: A search server receives meta index information reported by each member engine.

It should be noted that, the step is optional, and an execution order thereof is not limited thereto.

The meta index information may include one of or any combination of the following information.

(1) A term maximum normalization weight vector mnw= (mnw1, mnw2, . . . , mnwi, . . . , mnwp), where mnwi is a maximum normalization weight of a term ti with respect to all documents in a database or a sub-database corresponding to the member engine. mnwi may be calculated in the following manner. A normalization weight of each document in the database/sub-database with respect to the term ti is calculated. A value of the normalization weight may be a value obtained by dividing the number of occurrence (a word frequency) of the term ti in the document by a length of the document. The normalization weight of the term ti in the document=$TFi/|d|$, where the length $|d|$ of the document satisfies $|d|=\sqrt{tf1^2+tf2^2+...+tfn^2}$ (t f1 to tfn are word frequencies of all terms in the document), and TFi is the word frequency of the term ti. A maximum value is acquired from the normalization weights of all of the documents in the database/sub-database with respect to the term ti, thereby acquiring a maximum normalization weight of the term t1 in the database/sub-database.

(2) A term average normalization weight vector anw=(anw1, anw2, ..., anwi, ..., anwp), where anwi is an average normalization weight of the term ti with respect to all of the documents in the database or the sub-database corresponding to the member engine. anwi may be calculated in the following manner. The normalization weight of each of the documents in the database/sub-database with respect to the term ti is calculated. A value of the normalization weight may be a value obtained by dividing the number of occurrence (a word frequency) of the term ti in the document by a length of the document. The normalization weight of the term ti in the document=$TFi/|d|$, where the length $|d|$ of the document satisfies $|d|=\sqrt{tf1^2+tf2^2+...+tfn^2}$ (tf1 to tfn are word frequencies of all terms in the document), and TFi is the word frequency of the term ti. An average value of the normalization weights of all of the documents in the database/sub-database with respect to the term ti is acquired, thereby acquiring an average normalization weight of the term t1 in the database/sub-database.

(3) An interest model maximum normalization weight vector mnv=(mnv1, mnv2, ..., mnvi, ..., mnvn) of a document in the database or the sub-database, where mnvi is a maximum normalization weight of an $i^{th}$ dimension of an interest model of the document with respect to all documents in the database or the sub-database corresponding to the member engine. mnvi may be calculated by the following methods.

Method 1: A normalization weight of each of the documents in the database with respect to the $i^{th}$ dimension of the interest model is calculated, where a value of the normalization weight is a value obtained by dividing a sum of word frequencies of all words in a document belonging to a range of the $i^{th}$ dimension of the interest model (such as sports) by a length of the document. A maximum value is acquired from the normalization weights of all of the documents with respect to the $i^{th}$ dimension of the interest model, thereby acquiring a maximum normalization weight mnvi of the $i^{th}$ dimension of the interest model with respect to all documents in a database D.

Method 2: A normalization weight of each of the documents in the database with respect to the $i^{th}$ dimension of the interest model is calculated. Automatic classification is performed on the documents (the classification may adopt commonly used algorithms such as the Naïve Bayes algorithm, the K-nearest neighbor classification algorithm, the support vector machine, and the vector space model). A normalization score value of the document belonging to a type corresponding to the $i^{th}$ dimension is used as a value of the normalization weight of each of the documents with respect to the $i^{th}$ dimension of the interest model. A maximum value is acquired from the normalization weights of all of the documents with respect to the $i^{th}$ dimension of the interest model, thereby acquiring a maximum normalization weight mnvi of the $i^{th}$ dimension of the interest model with respect to all documents in the database D.

(4) An interest model average normalization weight vector anv=(anv1, anv2, ..., anvi, ..., anvn) of the document in the database or the sub-database, where anvi is an average normalization weight of the $i^{th}$ dimension of the interest model of the document with respect to all documents in the database corresponding to the member engine. anvi may be calculated by the following methods.

Method 1: A normalization weight of each of the documents in the database with respect to the $i^{th}$ dimension of the interest model is calculated. A value of the normalization weight is a value obtained dividing a sum of word frequencies of all words in a document belonging to a range of the $i^{th}$ dimension of the interest model (such as sports) by a length of the document. An average value of the normalization weights of all of the documents with respect to the $i^{th}$ dimension of the interest model is acquired, thereby acquiring an average normalization weight anvi of the $i^{th}$ dimension of the interest model with respect to all documents in the database D.

Method 2: A normalization weight of each of the documents in the database with respect to the $i^{th}$ dimension of the interest model is calculated. Automatic classification is performed on the document (the classification may adopt commonly used algorithms such as the Naïve Bayes algorithm, the K-nearest neighbor classification algorithm, the support vector machine, and the vector space model). A normalization score value of the document belonging to a type corresponding to the $i^{th}$ dimension is used as a value of the normalization weight of each of the documents with respect to the $i^{th}$ dimension of the interest model. An average value of the normalization weights of all of the documents with respect to the $i^{th}$ dimension of the interest model is acquired, thereby acquiring an average normalization weight anvi of the $i^{th}$ dimension of the interest model with respect to all documents in the database D.

(5) A global inverse document frequency gidfi of the term ti with respect to the database, where gidfi=$\log(n/(gdfi+1))$, gdfi is a sum of documents including the term ti in databases or sub-databases corresponding to all member engines, and n is a sum of all documents included by all of the member engines.

(6) A global inverse document frequency IM_gidfi corresponding to the $i^{th}$ dimension of the interest model of the document, where IM_gidfi=$\log(n/(IM\_gdfi+1))$, IM_gdfi is a sum of documents including the term belonging to the $i^{th}$ dimension of the interest model of the document included in the databases or the sub-databases corresponding to all of the member engines, and n is the sum of all documents included by all of the member engines.

Step 202: A search client sends a search request to a search application server.

Step 203: The search application server extracts a long-term interest model and an instant interest model of a user from a user database.

For example, the search application server may extract the long-term interest model of the user from information such as a static profile and search history of the user, or directly extract the long-term interest model pre-stored in the user database. In addition, the search application server may also extract the instant interest model of the user from relevant data of a query sequence q(1), ..., q(t−1), q(t) in the same search context session of a current query q(t). The search context session is a period of preset time before the current query q(t) occurs, for example, half an hour, plus time when q(t) currently occurs.

For a long-term interest model W1 corresponding to a static profile of the user, W1=(p1, p2, p3, ..., pn), where pi is a sum of word frequencies of all words in the static profile whose type belongs to the $i^{th}$ interest dimension. Or, classification is performed on a document corresponding to the static profile (the classification may adopt algorithms such as the Naïve Bayes algorithm, the K-nearest neighbor classification algorithm, the support vector machine, and the vector space model), and tj is a score value of a type of the document corresponding to the static profile, where the type of the document belongs to a type corresponding to a $j^{th}$ interest dimension.

For a long-term interest model W2 corresponding to search/click history of the user, W2=d1+d2+d3+ ... dm, where di is an interest model vector corresponding to a clicked document of the user, di=(t1, t2, t3, tn). When the user lately clicks the document, tj is a sum of word frequencies of all words in the document whose type belongs to the $j^{th}$ interest dimension. Or, classification is performed on the document (the classification may adopt algorithms such as the Naïve Bayes algorithm, the K-nearest neighbor classification algorithm, the support vector machine, and the vector space model), and tj is a score value of a type of the document whose type belongs to a type corresponding to the $j^{th}$ interest dimension. If the user evaluates a clicked document, and if the evaluation is high, the vector di is multiplied by a positive constant c to indicate that importance of the document increases, and di=c×di=(c×ti, c×t2, c×t3, ..., c×tn); if the evaluation is low, the vector di is multiplied by the reciprocal of the constant c to indicate that the importance of the document decreases, and di=1/c×di=(1/c×ti, 1/c×t2, 1/c×t3, ..., 1/c×tn). After a period of time, the value of tj again automatically decreases by a certain percentage to indicate that the importance of tj decreases over time until after a long period of time when the value of tj decreases to zero, and at the moment, di is deleted from the history record.

For an integrated long-term interest model, W1 and W2 are respectively normalized and then added up, that is, an interest model vector W=W1+W2; or a weighted sum of W1 and W2 is acquired, for example, the interest model vector W=W1× 30%+W2×70%, and then normalization is performed on W.

Step 204: The search application server sends the search request to the search server.

The search request carries the instant interest model and the long-term interest model.

Step 205: The search server selects a member engine according to the search request.

The search server may calculate similarity score values of databases corresponding to member engines according to the instant interest model, the long-term interest model, and the meta index information acquired in step 201, and selects a member engine of a large similarity score value. The aforementioned process may be referred to for methods for selecting a member engine and acquiring selection result information, which are not repeated herein.

Step 206: The search server distributes the search request to the selected member engine.

For example, the selection result information acquired by the search server may be ID information of the selected member engine, so that the search server may distribute the search request to the member engine corresponding to the ID information, and one or more member engines may search for the keyword information to acquire search result information.

In this embodiment, before requesting the member engine to search for the keyword information, the search server may select the member engine according to the instant interest model and the long-term interest model of the user, so that the member engine matching the keyword information to be searched for, the instant interest model and the long-term interest model of the user can be selected and acquired to search for the keyword information, so that the accurate search result information can be acquired, thereby further meeting a search demand of the user.

Figure 3:
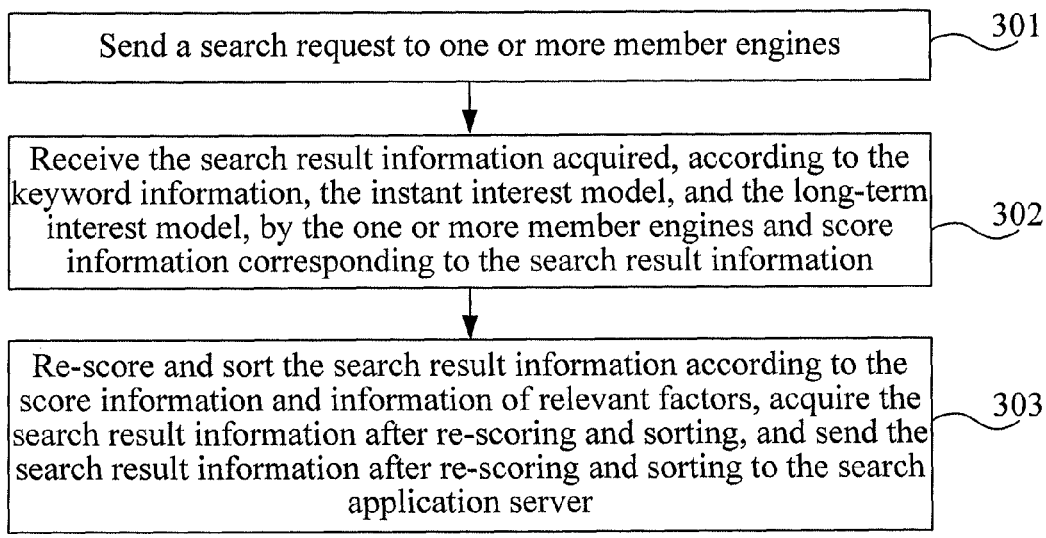
FIG. 3 is a flow chart of Embodiment 3 of a method for mobile search according to the present invention.

FIG. 3 is a flow chart of Embodiment 3 of a method for mobile search according to the present invention. As shown in FIG. 3, the method of this embodiment may include the following steps.

Step 301: Send a search request to one or more member engines. The search request carries keyword information to be searched for, and an instant interest model and a long-term interest model acquired by a search application server.

A search server may send the search request to one or more member engines to instruct the member engines that receive the search request to search according to the keyword information to be searched for, and the instant interest model and the long-term interest model acquired by the search application server, which are carried in the search request, so as to acquire the search result information having personalized score information.

For example, an interest model of a user may be represented in n dimensions, such as: news, sports, entertainment, finance and economics, science and technology, real estate, games, female, forum, weather, commodity, home appliance, music, books, blog, mobile phone, military, education, travel, multimedia message, color ring back tone, dining, civil aviation, industry, agriculture, computer, and geography. A vector W(r1, r2, r3, ..., rn formed by score values of interest dimensions of the user is the interest model of the user.

If a score value ri of each of the dimensions of the interest model W(r1, r2, r3, ..., rn) is calculated according to all search history data of the user and a static profile of the user, the interest model W(r1, r2, r3, ..., rn) is the long-term interest model of the user. If the score value ri of each of the dimensions of the interest model W(r1, r2, r3, ..., rn) is calculated according to relevant data of a query sequence q(1), ..., q(t−1), q(t) in the same search context session of a current query q(t), W(r1, r2, r3, ... rn) is the instant interest model of the user.

Step 302: Receive the search result information acquired, according to the keyword information, the instant interest model, and the long-term interest model, by the one or more member engines and score information corresponding to the search result information.

After receiving the search request, the member engine may search for the keyword information to be searched for to acquire the search result information. Then, the member engine may perform personalized scoring processing on the search result information according to the instant interest model and the long-term interest model, so as to acquire personalized score information corresponding to each piece of search result information. The score information may indicate a matching degree between each piece of the search result information and the instant interest model and the long-term interest model. The member engine may send the search result information and the corresponding score information to the search server.

Step 303: Re-score and sort the search result information according to the score information and information of relevant factors, acquire the search result information after re-scoring and sorting, and send the search result information after re-scoring and sorting to the search application server.

After receiving the search result information and the corresponding score information fed back by each of the member engines, the search server may perform re-scoring processing on the search result information, that is, perform further filtering processing on the search result information, so as to acquire the search result information more personalized and meeting demands. During the re-scoring processing, the search server may integrate the score information corresponding to each piece of the search result information and fed back by the member engine and information of other relevant factors to perform integrated scoring on the search result information. The information of relevant factors may include information of a price, a level, a search speed, and a rate of high evaluation of the member engine. Persons of ordinary skill in the art may integrate information that may affect the sorting into the process of the re-scoring processing as required.

After completing the re-scoring processing, the search server may feed back the search result information after the re-scoring processing to the search application server, so that the search application server can provide a search client with the personalized search result information that meets demands of the user and has high matching accuracy.

In this embodiment, the search server may send the instant interest model and the long-term interest model extracted by the search application server to the member engine, so that after the member engine acquires the search result information, the member engine may perform the personalized scoring processing on the search result information according to the instant interest model and the long-term interest model of the user, so as to acquire score information corresponding to each piece of the search result information. After receiving the search result information and the corresponding score information fed back by the member engine, the search server may further re-score and sort the search result information in combination with other relevant factors, so as to acquire the personalized search result information that meets demands of the user and has high matching accuracy.

In addition, another embodiment of the method for mobile search of the present invention may further include: receiving the search request sent by the search application server. The search request carries the keyword information to be searched for, and the instant interest model and the long-term interest model acquired by the search application server. The instant interest model may be an instant interest model vector formed by score values of N dimensions. The score value of each of the dimensions is calculated according to relevant data of a query sequence $q(1), \ldots, q(t-1), q(t)$ in the same search context session of a current query $q(t)$. The search context session is a period of preset time before the current query $q(t)$ occurs plus the time when the current query $q(t)$ occurs. The long-term interest model is a long-term interest model vector formed by score values of N dimensions. The score value of each of the dimensions is calculated according to the search history data and the static profile of the user.

Specifically, the search application server may acquire the instant interest model and the long-term interest model of the user from a user database according to a search request message sent by the search client. For example, the long-term interest model of the user is extracted from the user database such as information of the static profile and the search history of the user, or the long-term interest model pre-stored in the user database is directly extracted. In addition, the search application server may also extract the instant interest model of the user from relevant data in the same query sequence $q(1), \ldots, q(t-1), q(t)$ of the keyword information to be searched for. After extracting the instant interest model and the long-term interest model, the search application server may send the search request to the search server, so that the search server may search for the keyword information to be searched for according to the instant interest model and the long-term interest model of the user carried in the search request.

Furthermore, the information of relevant factors in step 303 may include: level information and/or price information of the member engine. Accordingly, the re-scoring and sorting the search result information according to the score information and the information of relevant factors in step 303 may include: calculating an integrated score value of the search result according to the score information, the level information and/or price information of the member engine, and performing sorting processing on the search result information according to the integrated score value. For example, the integrated score value of the search result information=r1×a score value returned by the member engine+r2×a score value related to the level of the member engine+r3×a score value related to a price factor, where r1+r2+r3=1.

It should be noted that in this embodiment, the method according to Embodiment 1 and Embodiment 2 may also be used to perform selection processing on the member engine to be used in advance, so that the search server only distributes the search request to the selected member engine, thereby further increasing search accuracy.

In this embodiment, the search server may send the instant interest model and the long-term interest model extracted by the search application server to the member engine, so that after the member engine acquires the search result information the member engine may perform the personalized scoring processing on the search result information according to the instant interest model and the long-term interest model of the user, so as to acquire the score information corresponding to each piece of the search result information. After receiving the search result information and the corresponding score information fed back by the member engine, the search server may further re-score and sort the search result information in combination with other relevant factors, so as to acquire the personalized search result information that meets demands of the user and has high matching accuracy.

Figure 4:
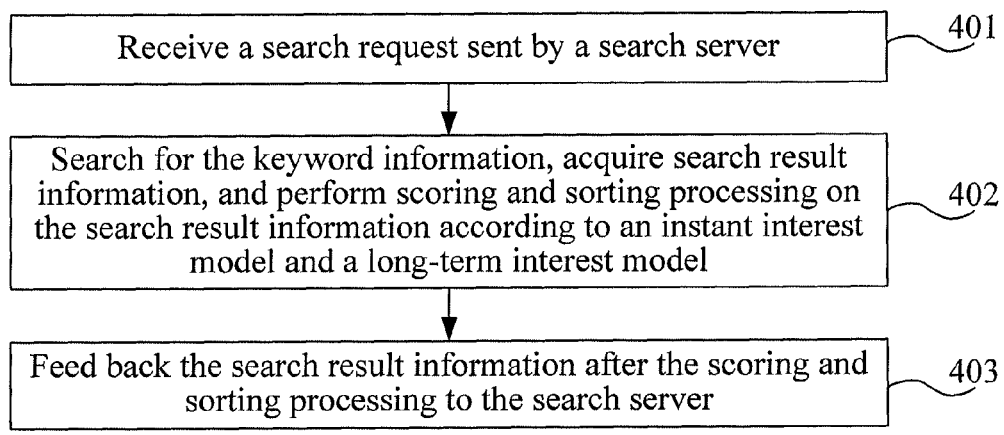
FIG. 4 is a flow chart of Embodiment 4 of a method for mobile search according to the present invention.

FIG. 4 is a flow chart of Embodiment 4 of a method for mobile search according to the present invention. As shown in FIG. 4, the method according to this embodiment may include the following steps.

Step 401: Receive a search request sent by a search server, where the search request carries keyword information to be searched for, and an instant interest model and a long-term interest model acquired by a search application server.

A member engine may receive the search request sent by the search server. The member engine may be a member engine selected by using the method according to Embodiment 1 and Embodiment 2.

Step 402: Search for the keyword information, acquire search result information, and perform scoring and sorting processing on the search result information according to the instant interest model and the long-term interest model.

After receiving the search request, the member engine may search for the keyword information to be searched for to acquire the search result information. Then, the member engine may perform personalized scoring processing on the search result information according to the instant interest model and the long-term interest model, so as to acquire score information corresponding to each piece of the search result information. The score information may indicate a matching degree between each piece of the search result information and the instant interest model and the long-term interest model.

Step 403: Feed back the search result information after the scoring and sorting processing to the search server.

The member engine may send the search result information and the corresponding score information to the search server.

After receiving the search result information and the corresponding score information fed back by each of the member engines, the search server may perform re-scoring processing on the search result information, that is, perform further filtering processing on the search result information, so as to acquire the search result information more personalized and meeting demands. During the re-scoring processing, the search server may integrate the score information corresponding to each piece of the search result information and fed back by the member engine and information of other relevant factors to perform integrated scoring on the search result information. The information of relevant factors may include information of a price, a level, a search speed, and a rate of high evaluation of the member engine. Persons of ordinary skill in the art may integrate information that may affect the sorting into the process of the re-scoring processing as required.

After completing the re-scoring processing, the search server may feed back the search result information after the re-scoring processing to the search application server, so that the search application server can provide a search client with the personalized search result information that meets demands of the user and has high matching accuracy.

Furthermore, the performing the scoring and sorting processing on the search result information according to the instant interest model and the long-term interest model in step 402 may include: calculating a first similarity between the instant interest model and the search result information; calculating a second similarity between the long-term interest model and the search result information; and acquiring a score value according to the first similarity and the second similarity, and performing sorting processing on the search result information according to the score value.

Specifically, the score value of the search result information=$r'_1 \times$the second similarity between the search result information and LIM+$r'_2 \times$the first similarity between the search result information and IIM, where $r'_1+r'_2=1$.

The calculating the second similarity between the search result information and a long-term interest model vector LIM (r1, ..., rn) includes the following steps.

Step (1): The member engine retrieves candidate search result information according to inverted indexes.

Step (2): The member engine performs personalized relevance scoring on the candidate search result information according to data of the long-term interest model.

W=(r1, r2, r3, ..., rn) is the long-term interest model sent by the search server, and D=(t1, t2, t3, ..., tn) is an interest model vector corresponding to the search result information.

A score value score1=W×D=r1×t1+r2×t2+r3×t3+...+rn×tn.

The calculating the first similarity between the search result information and an instant interest model IIM(u1, ..., un) includes the following steps.

Step (1): The member engine retrieves candidate search result information according to inverted indexes.

Step (2): The member engine performs personalized relevance scoring on the candidate search result information according to data of the instant interest model.

U=(u1, u2, u3, ..., un) is the instant interest model sent by the search server, and D=(t1, t2, t3, ..., tn) is an interest model vector corresponding to the search result information.

A score value score2=W×D=u1×t1+u2×t2+u3×t3+...+un×tn.

The score value=$r'_1 \times$score1+$r'_2 \times$score2 is calculated.

In this embodiment, the member engine may receive the instant interest model and the long-term interest model sent by the search server, so as to perform the personalized scoring processing on the search result information according to the instant interest model and the long-term interest model of the user after acquiring the search result information corresponding to the keyword information, thereby acquiring the personalized score information corresponding to each piece of the search result information and the search result information that meets demands of the user and has high matching accuracy.

The technical solution according to the aforementioned embodiment of the method for mobile search of the present invention is described below in detail through a specific embodiment.

Figure 5:
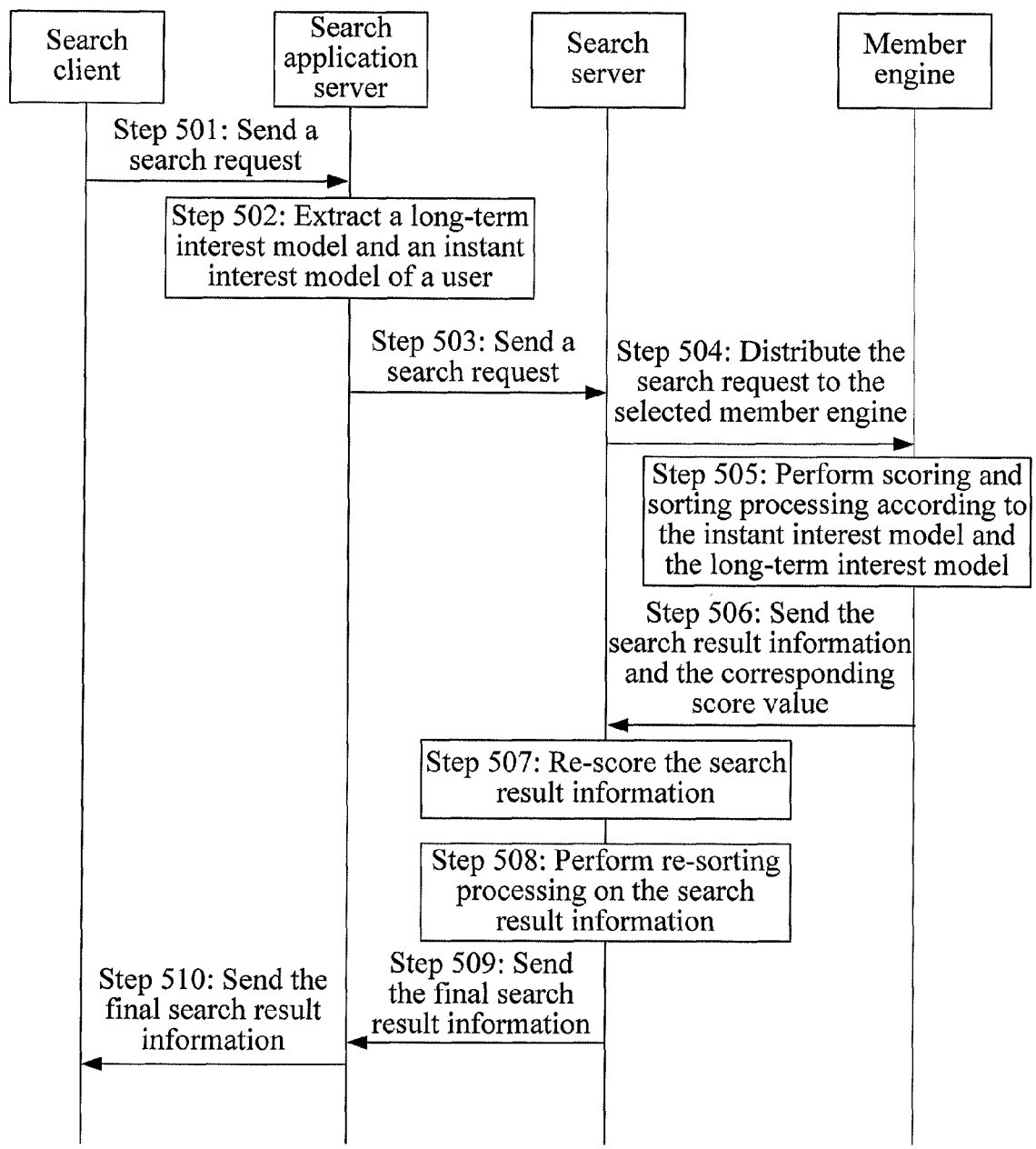
FIG. 5 is a signaling flow chart of Embodiment 5 of a method for mobile search according to the present invention.

FIG. 5 is a signaling flow chart of Embodiment 5 of a method for mobile search according to the present invention. As shown in FIG. 5, the method according to this embodiment may include the following steps.

Step 501: A search client sends a search request to a search application server.

The search request may carry keyword information to be searched for.

Step 502: The search application server extracts a long-term interest model and an instant interest model of a user from a user database.

For example, the search application server may extract the long-term interest model of the user from information such as a static profile and search history of the user, or directly extract the long-term interest model pre-stored in the user database. In addition, the search application server may also extract the instant interest model of the user from relevant data of a query sequence q(1), ..., q(t−1), q(t) in the same search context session of a current query q(t).

Step 503: The search application server sends the search request to a search server.

The search request may carry keyword information and the long-term interest model and the instant interest model of the user.

Step 504: The search server distributes the search request to a member engine.

The search request may carry the keyword information and the long-term interest model and the instant interest model of the user. The member engine may receive the search request sent by the search server. The member engine may be a member engine selected by using the method according to Embodiment 1 and Embodiment 2.

Step 505: The member engine searches for the keyword information, acquires search result information, and performs personalized relevance scoring and sorting processing on the search result information according to the instant interest model and the long-term interest model of the user.

The aforementioned method may be adopted in a process of acquiring a score value, which is not repeated herein.

Step 506: The member engine returns the search result information after the sorting processing and the corresponding score value to the search server.

Step 507: The search server re-scores the search result information according to the score value of the search result information and other relevant factors.

For example, an integrated score value of the search result information=r1×a score value returned by the member engine+r2×a score value related to a level of the member engine+r3×a score value related to a price factor, where r1+r2+r3=1.

Step 508: The search server performs re-sorting processing on the search result information according to the integrated score value.

Step 509: The search server sends final search result information to the search application server.

Step 510: The search application server sends the final search result information to the search client.

In this embodiment, the search server may send the instant interest model and the long-term interest model extracted by the search application server to the member engine, so that after the member engine acquires the search result information the member engine may perform the personalized scoring processing on the search result information according to the instant interest model and the long-term interest model of the user, so as to acquire the score information corresponding to each piece of the search result information. After receiving the search result information and the corresponding score information fed back by the member engine, the search server may further re-score and sort the search result information in combination with other relevant factors, so as to acquire the personalized search result information that meets demands of the user and has high matching accuracy.

Figure 6:
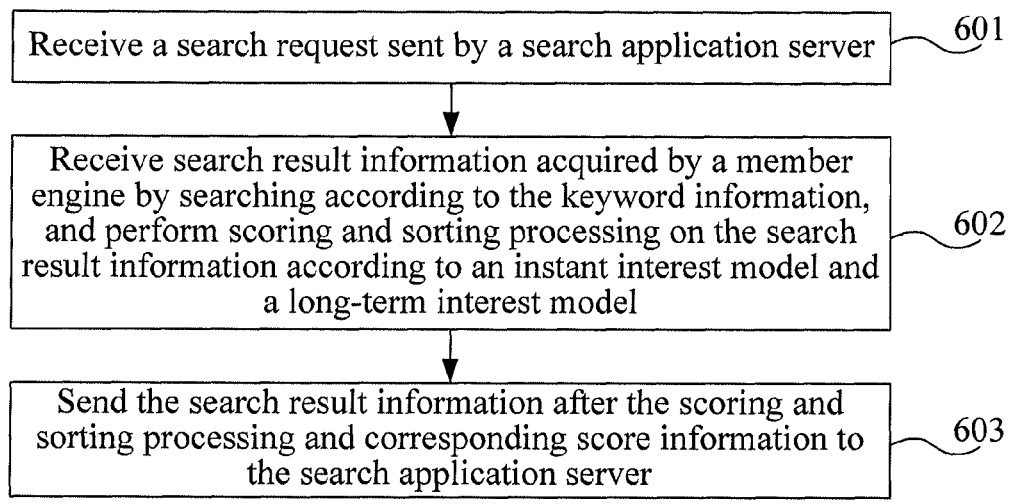
FIG. 6 is a flow chart of Embodiment 6 of a method for mobile search according to the present invention.

FIG. 6 is a flow chart of Embodiment 6 of a method for mobile search according to the present invention. As shown in FIG. 6, the method according to this embodiment may include the following steps.

Step 601: Receive a search request sent by a search application server. The search request carries keyword information to be searched for, and an instant interest model and a long-term interest model acquired by the search application server.

For example, the search server may receive the search request sent by the search application server. The search request carries the keyword information to be searched for, and the instant interest model and the long-term interest model acquired by the search application server. The search application server may acquire the instant interest model and the long-term interest model of a user from a user database according to a search request message sent by a search client. For example, the long-term interest model of the user is extracted from the user database such as information of a static profile and search history of the user, or the long-term interest model pre-stored in the user database is directly extracted. In addition, the search application server may also extract the instant interest model of the user from relevant data of a query sequence q(1) . . . , q(t−1), q(t) in the same search context session of a current query q(t). After extracting the instant interest model and the long-term interest model, the search application server may send the search request to the search server, so that the search server may search for the keyword information to be searched for according to the instant interest model and the long-term interest model of the user carried in the search request.

The interest model of the user may be represented in n dimensions, such as: news, sports, entertainment, finance and economics, science and technology, real estate, games, female, forum, weather, commodity, home appliance, music, books, blog, mobile phone, military, education, travel, multimedia message, color ring back tone, dining, civil aviation, industry, agriculture, computer, and geography. A vector $W(r1, r2, r3, \ldots, rn)$ formed by score values of dimensions of interest of the user is the interest model of the user.

If a score value ri of each of the dimensions of the interest model $W(r1, r2, r3, \ldots, rn)$ is calculated according to all search history data of the user and a static profile of the user, the interest model $W(r1, r2, r3, \ldots, rn)$ is the long-term interest model of the user. If the score value ri of each of the dimensions of the interest model $W(r1, r2, r3, \ldots, rn)$ is calculated according to relevant data of a query sequence q(1), . . . , q(t−1), q(t) in the same search context session of a current query q(t), $W(r1, r2, r3, \ldots rn)$ is the instant interest model of the user.

Step 602: Receive search result information acquired by a member engine by searching according to the keyword information, and perform scoring and sorting processing on the search result information according to the instant interest model and the long-term interest model.

The member engine may search according to the keyword information carried in the search request sent by the search server to acquire the search result information, and feed back the search result information to the search server. The search server may perform personalized scoring and sorting processing on the search result information according to the instant interest model and the long-term interest model.

Step 603: Send the search result information after the scoring and sorting processing and corresponding score information to the search application server.

The search server may send the search result information after the scoring and sorting processing and the corresponding score information to the search application server, so that the search application server feeds back the search result information and the corresponding score information to the search client, thereby providing the user with a personalized search result of high accuracy.

Furthermore, the performing the scoring and sorting processing on the search result information according to the instant interest model and the long-term interest model in step 602 may include: calculating a first similarity between the instant interest model and the search result information; calculating a second similarity between the long-term interest model and the search result information; and acquiring a score value according to the first similarity and the second similarity, and performing sorting processing on the search result information according to the score value.

Specifically, the score value of the search result information=$r'_1$×the second similarity between the search result information and LIM+$r'_1$×the first similarity between the search result information and IIM, where $r'_1+r'_2=1$.

The calculating the second similarity between the search result information and a long-term interest model vector LIM $(r1, \ldots, rn)$ includes the following steps.

Step (1): The member engine retrieves candidate search result information according to inverted indexes.

Step (2): The member engine performs personalized relevance scoring on the candidate search result information according to data of the long-term interest model.

$W=(r1, r2, r3, \ldots, rn)$ is the long-term interest model transmitted by the search server, and $D=(t1, t2, t3, \ldots, tn)$ is an interest model vector corresponding to the search result information.

A score value score1=$W \times D$=$r1 \times t1+r2 \times t2+r3 \times t3+ \ldots +rn \times tn$.

The calculating the first similarity between the search result information and an instant interest model IIM(u1, . . . , un) includes the following steps.

Step (1): The member engine retrieves candidate search result information according to inverted indexes.

Step (2): The member engine performs personalized relevance scoring on the candidate search result information according to data of the instant interest model.

$U=(u1, u2, u3, \ldots, un)$ is the instant interest model transmitted by the search server, and $D=(t1, t2, t3, \ldots, tn)$ is an interest model vector corresponding to the search result information.

A score value $score2=W \times D=u1 \times t1+u2 \times t2+u3 \times t3+\ldots+un \times tn$.

The score value$=r'_1 \times score1+r'_2 \times score2$ is calculated.

The search server may perform sorting processing on the search result information according to the score value, and acquire search result information after the sorting processing.

In this embodiment, the search server may perform the scoring and sorting processing on the search result information fed back by the member engine according to the instant interest model and the long-term interest model of the user, so as to provide the user with the personalized search result information that meets demands of the user and has high matching accuracy.

The technical solution according to the aforementioned embodiment of the method for mobile search of the present invention is described below in detail through a specific embodiment.

Figure 7:
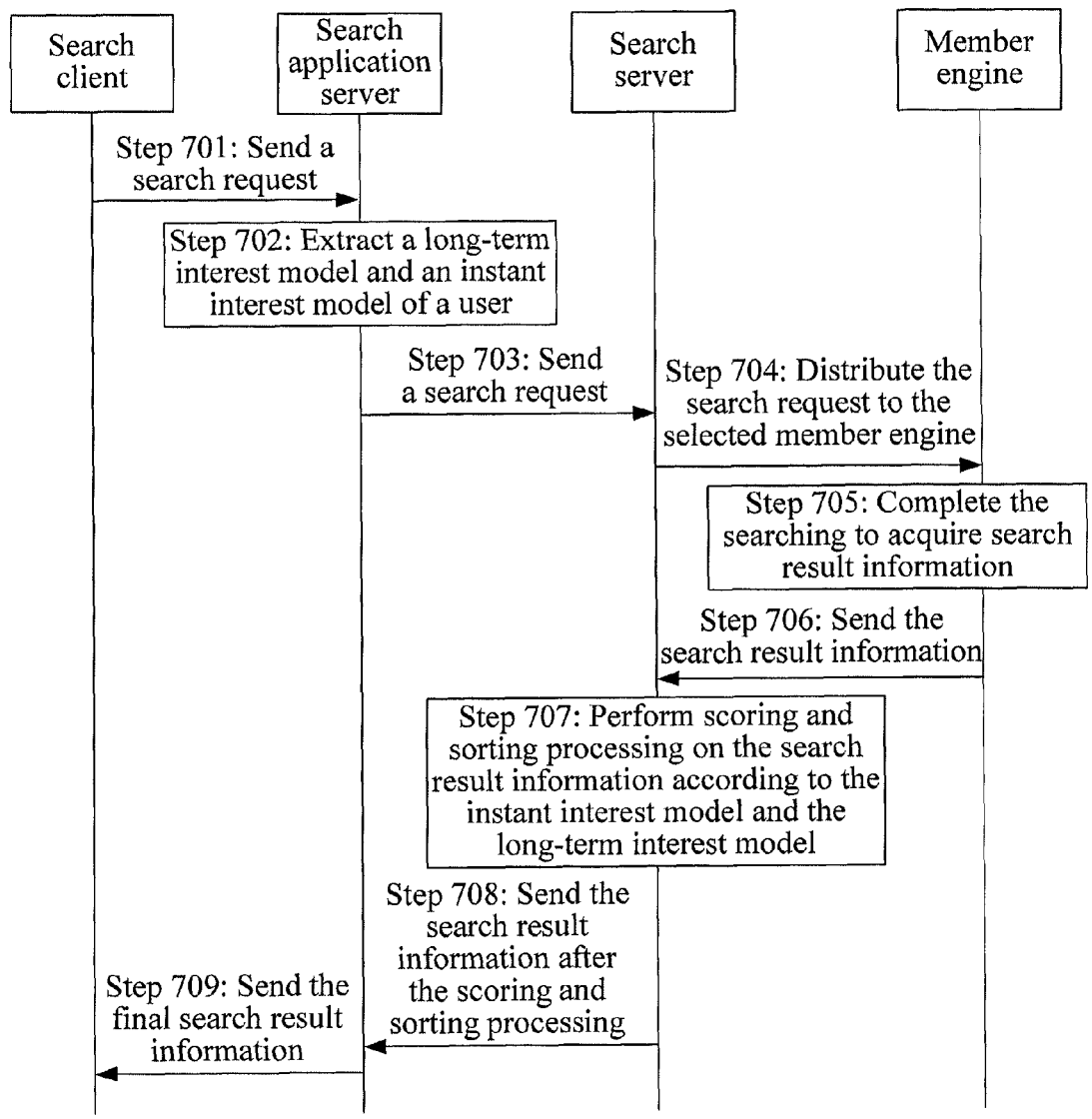
FIG. 7 is a signaling flow chart of Embodiment 7 of a method for mobile search according to the present invention.

FIG. 7 is a signaling flow chart of Embodiment 7 of a method for mobile search according to the present invention. As shown in FIG. 7, the method according to this embodiment may include the following steps.

Step 701: A search client sends a search request to a search application server.

The search request may carry keyword information to be searched for.

Step 702: The search application server extracts a long-term interest model and an instant interest model of a user from a user database.

For example, the search application server may extract the long-term interest model of the user from information such as a static profile and search history of the user, or directly extract the long-term interest model pre-stored in the user database. In addition, the search application server may also extract the instant interest model of the user from relevant data of a query sequence $q(1), \ldots, q(t-1), q(t)$ in the same search context session of a current query $q(t)$.

Step 703: The search application server sends the search request to a search server.

The search request may carry the keyword information and the long-term interest model and the instant interest model of the user.

Step 704: The search server distributes the search request to member engines.

The search request may carry the keyword information. The member engines may receive the search request sent by the search server. The member engines may be member engines selected by using the method according to Embodiment 1 and Embodiment 2.

Step 705: Each member engine completes the searching to acquire search result information.

Step 706: Each of the member engines returns the search result information to the search server.

Step 707: The search server performs scoring and sorting processing on the search result information according to the instant interest model and the long-term interest model.

A process of the scoring and sorting processing is described above, and is not repeated herein.

Step 708: The search server returns the search result information after the scoring and sorting processing to the search application server.

Step 709: The search application server returns the final search result information to the search client.

In this embodiment, the search server may perform the scoring and sorting processing on the search result information fed back by the member engine according to the instant interest model and the long-term interest model of the user, so as to provide the user with the personalized search result information that meets demands of the user and has high matching accuracy.

Figure 8:
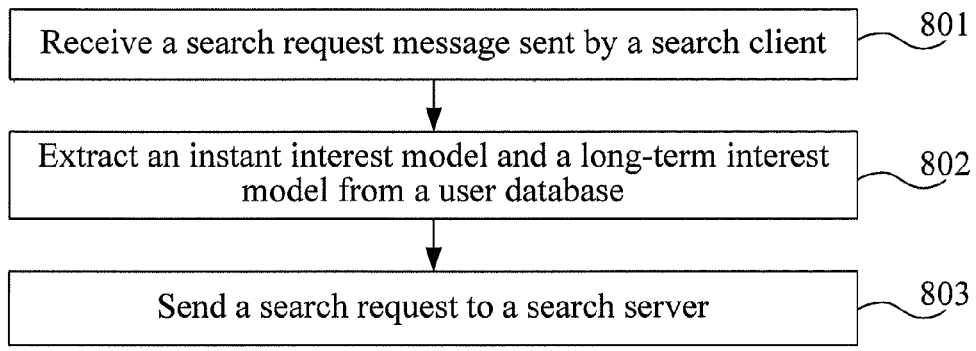
FIG. 8 is a flow chart of Embodiment 8 of a method for mobile search according to the present invention.

FIG. 8 is a flow chart of Embodiment 8 of a method for mobile search according to the present invention. As shown in FIG. 8, the method according to this embodiment may include the following steps.

Step 801: Receive a search request message sent by a search client, where the search request message carries keyword information.

Specifically, a search application server may receive the search request message sent by the search client. The search request message may carry the keyword information to be searched for.

Step 802: Extract an instant interest model and a long-term interest model from a user database.

The search application server may extract the instant interest model and the long-term interest model from the user database. For example, the search application server may extract the long-term interest model of the user from information such as a static profile and search history of the user, or directly extract the long-term interest model pre-stored in the user database. In addition, the search application server may also extract the instant interest model of the user from relevant data of a query sequence $q(1), \ldots, q(t-1), q(t)$ in the same search context session of a current query $q(t)$.

For example, an interest model of a user may be represented in n dimensions, such as: news, sports, entertainment, finance and economics, science and technology, real estate, games, female, forum, weather, commodity, home appliance, music, books, blog, mobile phone, military, education, travel, multimedia message, color ring back tone, dining, civil aviation, industry, agriculture, computer, and geography. A vector $W(r1, r2, r3, \ldots, rn)$ formed by score values of dimensions of interest of the user is the interest model of the user.

If a score value ri of each of the dimensions of the interest model $W(r1, r2, r3, \ldots, rn)$ is calculated according to all search history data of the user and a static profile of the user, the interest model $W(r1, r2, r3, \ldots, rn)$ is the long-term interest model of the user. If the score value ri of each of the dimensions of the interest model $W(r1, r2, r3, \ldots, rn)$ is calculated according to relevant data of a query sequence $q(1), \ldots, q(t-1), q(t)$ in the same search context session of a current query $q(t)$, $W(r1, r2, r3, \ldots rn)$ is the instant interest model of the user.

For a long-term interest model W1 corresponding to a static profile of the user, $W1=(p1, p2, p3, \ldots, pn)$, where pi is a sum of word frequencies of all words in the static profile whose type belongs to the $i^{th}$ interest dimension. Or, classification is performed on a document corresponding to the static profile (the classification may adopt algorithms such as the Naïve Bayes algorithm, the K-nearest neighbor classification algorithm, the support vector machine, and the vector space model), and tj is a score value of a type of the document corresponding to the static profile, where the type of the document belongs to a type corresponding to a $j^{th}$ interest dimension.

For a long-term interest model W2 corresponding to search/click history of the user, $W2=d1+d2+d3+\ldots dm$, where di is an interest model vector corresponding to a clicked document of the user, $di=(t1, t2, t3, \ldots, tn)$. When the user newly clicks the document, tj is a sum of word frequencies of all words in the document whose type belongs to the $j^{th}$ interest dimension. Or, classification is performed on the document (the classification may adopt algorithms such as the Naïve Bayes algorithm, the K-nearest neighbor classification algorithm, the support vector machine, and the vector space model), and tj is a score value of a type of the document whose type belongs to a type corresponding to the $j^{th}$ interest dimension. If the user evaluates a clicked document, and if the evaluation is high, the vector di is multiplied by a positive constant c to indicate that importance of the document increases, and di=c×di=(c×ti, c×t2, c×t3, . . . , c×tn); if the evaluation is low, the vector di is multiplied by the reciprocal of the constant c to indicate that the importance of the document decreases, and di=1/c×di=(1/c×ti, 1/c×t2, 1/c×t3, . . . , 1/c×tn). After a period of time, the value of tj again automatically decreases by a certain percentage to indicate that the importance of tj decrease over time until after a long period of time when the value of tj decreases to zero, and at the moment di is deleted from the history record.

For an integrated long-term interest model, W1 and W2 are respectively normalized and then added up, that is, an interest model vector W=W1+W2; or a weighted sum of W1 and W2 is acquired, for example, the interest model vector W=W1× 30%+W2×70%, and then normalization is performed on W.

Step 803: Send a search request to a search server, where the search request carries the keyword information, the instant interest model, and the long-term interest model, so that the search server searches for the keyword information according to the instant interest model and the long-term interest model.

The search application server may send the keyword information to the search server, and also send the instant interest model and the long-term interest model acquired through extraction to the search server, so that the search server searches for the keyword information according to the instant interest model and the long-term interest model. A specific process of the search server performing the searching may be implemented by using the method according to Embodiment 3 to Embodiment 7.

Furthermore, the extracting the instant interest model from the user database in step 802 may include: using a CRF model to calculate a conditional probability of an output type of the current query q(t) when the query sequence q(1), . . . q(t−1), q(t) in the same search context session of the current query q(t) is given. A conditional probability value is used as the score value of the interest dimension of the instant interest model corresponding to the output type.

For example, in this embodiment G=(V,E) may be defined as an undirected graph, and Y={$Y_v$|v∈V}. That is to say, each node in V corresponds to a component $Y_v$ of a flag sequence represented by a random variable. If for G each random value $Y_v$ complies with the Markov property, (X, Y) is a CRF, and when X and all other random variables $Y_{\{u|u \neq v, \{u,v\} \in V\}}$ are given, a probability P($Y_v$|X,$Y_u$,u≠v,{u,v}∈V) of the random variable $Y_v$ equals P($Y_v$|X,$Y_u$,(u,v)∈E).

According to the Markov property and the maximum entropy principle, a CRF classical conditional probability formula may be derived:

when an observation sequence x is given, a conditional probability of a status flag sequence y of the observation sequence satisfies:

$$P_\theta(y \mid x) = \frac{1}{Z(x)} \exp\left(\sum_{e \in E, k} \lambda_k f_k(e, y\mid_e, x) + \sum_{v \in V, k} u_k g_k(v, y\mid_v, x)\right)$$

where x is the observation sequence, y is the flag status sequence, $y\mid_S$ is a set of components of the sequence y associated with a vertex of a subgraph S, f and g are characteristic functions, λ, μ are weight values of the characteristic functions, and Z(x) is a normalization factor.

when the query sequence q=q1, . . . , q(T−1), q(T) in the same session is given, a conditional probability of a type sequence C=$c_1$, $c_{T-1}$, $c_T$ corresponding to the query sequence is output:

a value space of $c_i$ is |C|, $c_0$=start, $c_{T+1}$=end, status of start and end are added to |C|

$$p(c \mid q) = \frac{1}{Z(q)} \prod_{i=1}^{T+1} M_t(c_{t-1}, c_t \mid q),$$

$$\text{where: } Z(q) = \sum_c \prod_{t=1}^{T+1} M_t(c_{t-1}, c_t \mid q),$$

and is a normalization factor.

$$M_t(c_{t-1}, c_t \mid q) = \exp\left(\sum_k \lambda_k f_k(c_{t-1}, c_t, q) + \sum_k u_k g_k(c_t, q)\right)$$

a matrix of |C|×|C| is defined:
$M_t(q)=[M_t(c_{t-1},c_t|q)]$ then Z(q) equals an item (start, end) of the matrix $M_1(q)* \ldots M_T(q)*M_{T+1}(q)$.

$$Z(q) = \sum_c \prod_{t=1}^{T+1} M_t(c_{t-1}, c_t \mid q)$$

$$= \sum_{\text{start} c_1 \ldots c_{T-1} c_T \text{end}} \prod_{t=1}^{T+1} M_t(c_{t-1}, c_t \mid q)$$

$$= \left(\prod_{t=1}^{T+1} M_t(q)\right)_{\text{start,end}}$$

$$\theta = (\lambda_1, \lambda_2, \ldots ; u_1, u_2, \ldots)$$

determination of the parameter θ:

training data D={($q^{(i)}$, $c^{(i)}$)}$^{i=1N}$ and an empirical distribution $\tilde{p}$(q, c) are given, a log-likelihood function of the training data is:

$$L(\theta) = \sum_{i=1}^N \log P_\theta(c^{(i)} \mid q^{(i)})$$

$$\propto \sum_{q,c} \tilde{p}(q, c) \log(p_\theta(c \mid q))$$

θth at making L(θ) achieve a maximum value is calculated.

In this embodiment, $\theta$ may be calculated by using a GIS algorithm:

(a) Calculation of $Ef_k$ and $Eg_k$:

$$Ef_k = \sum_{q,c} p_\theta(q,c) f_k(q,c)$$
$$= \sum_{q,c} p_\theta(q) p_\theta(c \mid q) f_k(q,c)$$
$$\approx \sum_{q,c} \tilde{p}(q) p_\theta(c \mid q) f_k(q,c)$$
$$= \sum_q \tilde{p}(q) \sum_{i=1}^{T} \sum_{c_{i-1} c_i} (p_\theta(c_{i-1}, c_i \mid q) f_k(c_{i-1}, c_i, q))$$

$$p_\theta(c_{i-1}, c_i \mid q) = \sum_{startc_1 \ldots c_{i-2} c_{i+1} \ldots c_T end} p_\theta(startc_1, \ldots, c_T end \mid q)$$
$$= \frac{1}{Z(q)} \sum_{startc_1 \ldots c_{i-2} c_{i+1} \ldots c_T end} \prod_{t=1}^{T+1} M_t(c_{t-1}, c_t \mid q)$$
$$= \frac{1}{Z(q)} \left( \sum_{startc_1 \ldots c_{i-2}} \prod_{t=1}^{i-1} M_t(c_{t-1}, c_t \mid q) \right)$$
$$M_i(c_{i-1}, c_i \mid q)$$
$$\left( \sum_{c_{i+1} \ldots c_T end} \prod_{t=i+1}^{T+1} M_t(c_{t-1}, c_t \mid q) \right)$$
$$= \frac{1}{Z(q)} \left( \left( \prod_{t=1}^{i-1} M_t(q) \right)_{start, c_{i-1}} M_i(c_{i-1}, c_i \mid q) \left( \prod_{t=i+1}^{T+1} M_t(q) \right)_{c_i, end} \right)$$
$$= \frac{1}{Z(q)} \alpha_{i-1}(c_{i-1} \mid q) M_i(c_{i-1}, c_i \mid q) \beta_i(c_i \mid q))$$

where:

$\alpha_i(q)$ is a vector of $1 \times |C|$, $\alpha_i(q) = \alpha_{i-1} M_i(q)$ if $c_i = start$, $\alpha_0(c_i \mid q) = 1$ otherwise, $\alpha_0(c_t \mid q) = 0$ $\beta(i)$ is a vector of $1 \times |C|$, $\beta(i)^T = M_{i+1}(q) \beta(i+1)^T$ if $c_t = end$, $\beta_{T+1}(c_t \mid q) = 1$ otherwise, $\beta_{T+1}(c_t \mid q) = 0$ $$Eg_k = \sum_{q,c} p_\theta(q,c) g_k(q,c)$$
$$= \sum_{q,c} p_\theta(q) p_\theta(c \mid q) g_k(q,c)$$
$$\approx \sum_{q,c} \tilde{p}(q) p_\theta(c \mid q) g_k(q,c)$$
$$= \sum_q \tilde{p}(q) \sum_{i=1}^{T} \sum_{c_i} p_\theta(c_i \mid q) g_k(c_i, q)$$

$$p_\theta(c_i \mid q) = \sum_{c_1 \ldots c_{i-1} c_{i+1} \ldots c_T} p_\theta(c_1, \ldots, c_T \mid q)$$
$$= \frac{1}{Z(q)} \sum_{c_1 \ldots c_{i-1} c_{i+1} \ldots c_T} \prod_{t=1}^{T} M_t(c_{t-1}, c_t, q)$$
$$= \frac{1}{Z(q)} \left( \sum_{c_1 \ldots c_{i-1}} \prod_{t=1}^{i} M_t(c_{t-1}, c_t, q) \right)$$
$$\left( \sum_{c_{i+1} \ldots c_T} \prod_{t=i+1}^{T} M_t(c_{t-1}, c_t, q) \right)$$
$$= \frac{1}{Z(q)} \left( \left( \prod_{t=1}^{i} M_t(q) \right)_{start, c_i} \left( \prod_{t=i+1}^{T+1} M_t(q) \right)_{c_i, end} \right)$$
$$= \frac{1}{Z(q)} \alpha(i) \beta(i)$$

(b) Calculation of $\tilde{E}f_k$ and $\tilde{E}g_k$:

$$\tilde{E}f_k = \sum_{q,c} \tilde{p}(q,c) f_k(q,c)$$
$$= \sum_{q,c} \tilde{p}(q) \tilde{p}(c \mid q) f_k(q,c)$$
$$= \sum_q \tilde{p}(q) \sum_{i=1}^{T} \sum_{c_{i-1} c_i} \tilde{p}(c_{i-1}, c_i \mid q) f_k(c_{i-1}, c_i, q)$$

$$\tilde{E}g_k = \sum_{q,c} \tilde{p}(q,c) g_k(q,c)$$
$$= \sum_{q,c} \tilde{p}(q) \tilde{p}(c \mid q) g_k(q,c)$$
$$= \sum_q \tilde{p}(q) \sum_{i=1}^{T} \sum_{c_i} \tilde{p}(c_i \mid q) g_k(c_i q)$$

(c) Iterative calculation of $\lambda_k$ and $u_k$ until $\lambda_k$ and $u_k$ converge:

$$\delta \lambda_k = \frac{1}{S_1} \log \frac{\tilde{E}f_k}{Ef_k},$$

where $S_1$ is a constant greater than 1, so that q and c of any values satisfy $$\sum_{k=0}^{n} f_k(q, c) = S_1$$

$$\lambda_{k+1} = \lambda_k + \delta\lambda_k$$

$$\delta u_k = \frac{1}{S_2} \log \frac{\tilde{E}g_k}{Eg_k},$$

where $S_2$ is a constant greater than 1, so that q and c of any values satisfy $$\sum_{k=0}^{n} g_k(q, c) = S_2$$

$$u_{k+1} = u_k + \delta u_k$$

Steps (a), (b), and (c) are repeated until $\lambda_k$ and $u_k$ converge.

when the query sequence $q=q1, \ldots, q(T-1), q(T)$ in the same session is given, a conditional probability of the current query q(T) belonging to the type $c_T$ satisfies:

$$p(c_T | q) = \sum_{c_1 \ldots c_{T-1}} p(c | q)$$

$$= \frac{1}{Z(q)} \left( \sum_{\text{start}c_1 \ldots c_{T-1}} \prod_{t=1}^{T+1} M_t(c_{t-1}, c_t | q) \right)$$

$$= \frac{1}{Z(q)} \left( \sum_{\text{start}c_1 \ldots c_{T-1}} \prod_{t=1}^{T} M_t(c_{t-1}, c_t | q) \right)$$

$$M_{T+1}(c_T, c_{end} | q))$$

$$= \frac{1}{Z(q)} \left( \left( \prod_{t=1}^{T} M_t(q) \right)_{\text{start},c_T} M_{T+1}(c_T, c_{end} | q) \right)$$

$$= \frac{1}{Z(q)} \alpha_T(c_T | q) M_{T+1}(c_T, c_{end} | q)$$

$p(c_T|q)$ is used as the score value of the dimension of the instant interest model corresponding to the type $c_T$.

Selection of a local characteristic function $g_k$:

(1) A theme word and related words of each field type $C_T$ all are given weights, and the weights of the theme word and the related words form a vector $c_T (t_1, \ldots, t_{n-1}, t_n)$ of a field $c_T$.

Two methods may be used to allocate weights to words in $c_T$.

In one method the weights are allocated manually.

The weights of the words in $C_T$ are given by this way: the theme word is given a maximum weight, strongly related words are given medium weights, and weakly related words are given minimum weights.

For example, the theme word (such as "sichuan cuisine" in a dining field $c_T$) is given a weight of 1, a strongly related word (such as "spicy" in the dining field $C_T$) is given a weight of 0.8, and a weakly related word (such as "delicious" in the dining field $C_T$) is given a weight of 0.5.

In the other method the weights are allocated automatically by learning.

For each field $C_T$, some representative training text corpus data is collected.

Word cutting is performed on a sample corpus to create a thesaurus of the field $C_T$.

A weight of a word in the field $c_T$ is calculated, and the weight=TF×GIDF, where TF is a total word frequency of the word in all corpora of the field $C_T$, GIDF is a global inverse document frequency, GIDF=log(1+N/GDF), where N is the count of all documents of all fields, and GDF is a global document frequency, that is, the count of the documents including the word in all of the fields.

Threshold values, for example, T1, T2, ..., Tn, of all levels are set, where T1>T2> ... >Tn.

The words in the thesaurus of the field $c_T$ are divided into sets of multiple levels according to the weights thereof and the threshold values, and the $(i+1)^{th}$ level satisfies Ti>a total word frequency>Ti+1.

Words of each of the levels are given a final score value respectively. Words of the first level are given a highest score value, and words of a medium level are given a medium score value, and words of an $n^{th}$ level are given a smallest score value.

Words in the thesaurus and final score values thereof form a vector of the field $c_T$.

(2) Keywords in the search request are given weights to form a query vector Query (q1, q2, ..., qn').

The weights of the keywords of query may be given by the following methods.

Method 1: All of the keywords are given a weight of 1.

Method 2: The first keyword is given a maximum weight (for example, the weight of 1), the keyword in the middle is given a medium weight (for example, 0.5<the weight<1), and the last keyword is given a minimum weight (for example, the weight of 0.5).

(3) A cosine similarity between the field vector $c_T$(t1, t2, ..., tn) and the query vector $q_T$(q1, q2, ..., qn') is calculated:

$Sim(q_T(q1, q2, \ldots, qn'),$ $c_T(t1, t2, \ldots, tn)) = (q1 \times t1 + q2 \times t2 + \ldots + qn \times tn) /$ $\left( \sqrt{q1^2 + q2^2 + \ldots + qn^2} \times \sqrt{t1^2 + t2^2 + \ldots + tn^2} \right)$ (4) $g_1(c_T, q_T) = \text{sim}(q_T, c_T)$;

(5) All user clicked history documents $U_T = \{u_T\}$ of the query q(t) are collected from search history data, where $u_T$ is a vector of user clicked search result documents corresponding to the query $q_T$. A cosine similarity between $u_T$ and $c_T$ is calculated:

$sim(c_T(t1, t2, \ldots, tn),$ $u_T(u1, u2, \ldots, un)) = (u1 \times t1 + u2 \times t2 + \ldots + un \times tn) /$ $\left( \sqrt{u1^2 + u2^2 + \ldots + un^2} \times \sqrt{t1^2 + t2^2 + \ldots + tn^2} \right)$ (6) $g_2(c_T, q_T) = \dfrac{\sum_{u_T} sim(c_T, u_T)}{|U_T|}$ Selection of a Context Related Characteristic Function $f_k$:

(1) Direct Association

A flag sequence pair of a query sequence pair $(q_{t-1}, q_t)$ is set to be $(c_{t-1}, c_t)$. In this embodiment, $f_1(c_{t-1}, c_t, q)$ is calculated according to the number of occurrence of the flag sequence pair $(c_{t-1}, c_t)$ when the query sequence pair $(q_{t-1}, q_t)$ is given.

$$f_1(c_{t-1}, c_t, q) = \frac{O(c_{t-1}, c_t)}{O(q_{t-1}, q_t)}$$

where $O(c_{t-1},c_t)$ is the number of occurrence of the flag sequence pair $(c_{t-1},c_t)$ when the query sequence pair $(q_{t-1},q_t)$ is given.

$O(q_{t-1},q_t)$ is a total number of occurrence of the query sequence pair $(q_{t-1},q_t)$.

(2) Indirect Association by Using a Classification Directory Tree

Assume that the flag sequence pair $(c_{t-1},c_t)$ is at an $n^{th}$ level of a classification directory tree, a set of ancestor node pairs of $(c_{t-1},c_t)$ is $\{(a_{c_{t-1}}^{(i)}, a_{c_t}^{(i)})\}, 1 \le i \le n-1$. In this embodiment, $f_2(c_{t-1},c_t,q)$ is calculated according to the number of occurrence of the ancestor node pair $(a_{c_{t-1}}^{(i)}, a_{c_t}^{(i)})$ of $(c_{t-1},c_t)$ when the query sequence pair $(q_{t-1},q_t)$ is given.

$$f_2(c_{t-1}, c_t, q) = \frac{\sum_{i=1}^{n-1} O(a_{c_{t-1}}^{(i)}, a_{c_t}^{(i)})}{O(q_{t-1}, q_t)}$$

where $O(a_{c_{t-1}}^{(i)}, a_{c_t}^{(i)})$ is the number of occurrence of the ancestor node pair $(a_{c_{t-1}}^{(i)}, a_{c_t}^{(i)})$ of $(c_{t-1},c_t)$ when the query sequence pair $(q_{t-1},q_t)$ is given, and $O(q_{t-1},q_t)$ is the total number of occurrence of the query sequence pair $(q_{t-1}, q_t)$.

In this embodiment, the search application server extracts the instant interest model and the long-term interest model of the user, so that the search server can perform the corresponding searching according to the instant interest model and the long-term interest model of the user, thereby providing the user with the personalized search result information that meets demands of the user and has high matching accuracy.

Figure 9:
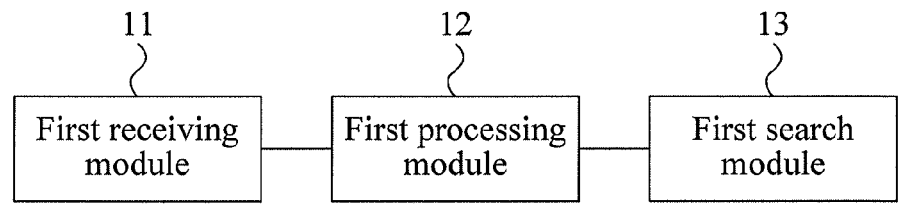
FIG. 9 is a schematic structure diagram of Embodiment 1 of a search server according to the present invention.

FIG. 9 is a schematic structure diagram of Embodiment 1 of a search server according to the present invention. As shown in FIG. 9, the search server according to this embodiment may include: a first receiving module 11, a first processing module 12, and a first search module 13. The first receiving module 11 is configured to receive a search request, where the search request carries keyword information to be searched for, an instant interest model, and a long-term interest model. The first processing module 12 is configured to calculate a relevance score value of each member engine according to meta index information of the member engine, the instant interest model, and the long-term interest model. The first search module 13 is configured to select, according to the relevance score value, one or more member engines to search for the keyword information.

The implementation principle of the search server according to this embodiment is the same as the implementation principle of Embodiment 1 of the method, and is not repeated herein.

In this embodiment, before requesting the member engine to search for the keyword information, the search server may select the member engine according to the instant interest model and the long-term interest model of a user, so that the member engine matching the keyword information to be searched for, the instant interest model, and the long-term interest model can be selected and acquired to search for the keyword information, and accurate search result information can be acquired, thereby further meeting a search demand of the user.

Figure 10:
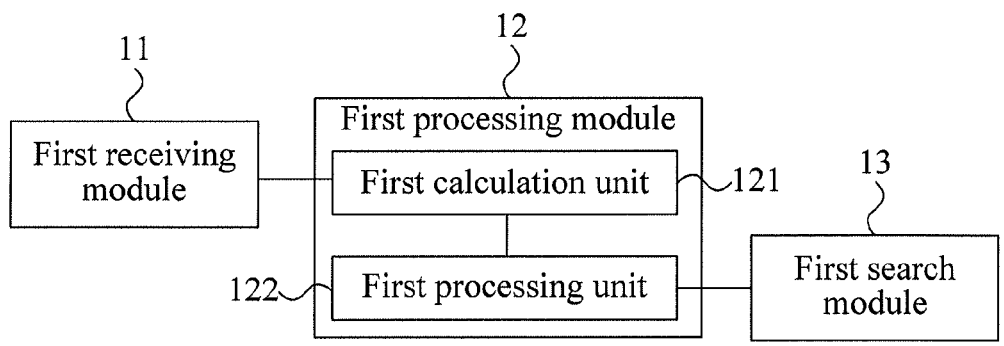
FIG. 10 is a schematic structure diagram of Embodiment 2 of a search server according to the present invention.

FIG. 10 is a schematic structure diagram of Embodiment 2 of a search server according to the present invention. As shown in FIG. 10, in the search server according this embodiment based on the search server shown in FIG. 9, the instant interest model received by the first receiving module 11 is an instant interest model vector formed by score values of N dimensions. The score value of each of the dimensions is calculated according to relevant data of a query sequence $q(1), \ldots, q(t-1), q(t)$ in the same search context session of a current query $q(t)$. The search context session is a period of preset time before the current query $q(t)$ occurs plus the time when the current query $q(t)$ occurs.

The first processing module 12 may include: a first calculation unit 121 and a first processing unit 122. The first calculation unit 121 is configured to calculate a first maximum similarity between the keyword information and the meta index information of the member engine; calculate a second maximum similarity between the meta index information of the member engine and the instant interest model based on that a similarity between the meta index information of the member engine and the keyword information is greater than a first threshold value and a similarity between the meta index information of the member engine and the long-term interest model is greater than a second threshold value; calculate a third maximum similarity between the meta index information of the member engine and the long-term interest model based on that the similarity between the meta index information of the member engine and the keyword information is greater than a third threshold value and a similarity between the meta index information of the member engine and the instant interest model is greater than a fourth threshold value; and calculate a fourth maximum similarity between the meta index information of the member engine and a resulting vector of a weighted sum of the long-term interest model and the instant interest model based on that the similarity between the meta index information of the member engine and the keyword information is greater than a fifth threshold value. The first processing unit 122 is configured to calculate a similarity score value of the member engine according to the first maximum similarity, the second maximum similarity, the third maximum similarity, and the fourth maximum similarity.

The implementation principle of the search server according to this embodiment is the same as the implementation principle of Embodiment 2 of the method, and is not repeated herein.

In this embodiment, before requesting the member engine to search for the keyword information, the search server may select the member engine according to the instant interest model and the long-term interest model of a user, so that the member engine matching the keyword information to be searched for, the instant interest model, and the long-term interest model can be selected and acquired to search for the keyword information, and accurate search result information can be acquired, thereby further meeting a search demand of the user.

Figure 11:
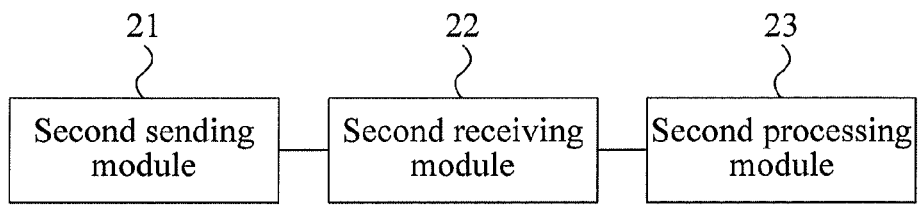
FIG. 11 is a schematic structure diagram of Embodiment 3 of a search server according to the present invention.

FIG. 11 is a schematic structure diagram of Embodiment 3 of a search server according to the present invention. As shown in FIG. 11, the search server according to this embodiment may include: a second sending module 21, a second receiving module 22, and a second processing module 23. The second sending module 21 is configured to send a search request to one or more member engines. The search request carries keyword information to be searched for, and an instant interest model and a long-term interest model acquired by a search application server. The second receiving module 22 is configured to receive search result information acquired and fed back, by the one or more member engines, according to the instant interest model and the long-term interest model and score information corresponding to the search result information after the one or more member engines search for the keyword information. The second processing module 23 is configured to re-score and sort the search result information according to the score information and information of relevant factors, acquire the search result information after re-scoring and sorting, and send the search result information after re-scoring and sorting to the search application server through the second sending module.

In addition, the second receiving module 22 is further configured to receive the search request sent by the search application server. The search request carries the keyword information to be searched for, and the instant interest model and the long-term interest model acquired by the search application server. The instant interest model received by the second receiving module 22 is an instant interest model vector formed by score values of N dimensions. The score value of each of the dimensions is calculated according to relevant data of a query sequence q(1), . . . , q(t−1), q(t) in the same search context session of a current query q(t). The search context session is a period of preset time before the current query q(t) occurs plus the time when the current query q(t) occurs.

The implementation principle of the search server according to this embodiment is the same as the implementation principle of Embodiment 3 and Embodiment 5 of the method, and is not repeated herein.

In this embodiment, the search server may send the instant interest model and the long-term interest model extracted by the search application server to the member engine, so that after the member engine acquires the search result information, the member engine may perform the personalized scoring processing on the search result information according to the instant interest model and the long-term interest model of a user, so as to acquire the score information corresponding to each piece of the search result information. After receiving the search result information and the corresponding score information fed back by the member engine, the search server may further re-score and sort the search result information in combination with other relevant factors, so as to acquire the personalized search result information that meets demands of the user and has high matching accuracy.

Figure 12:
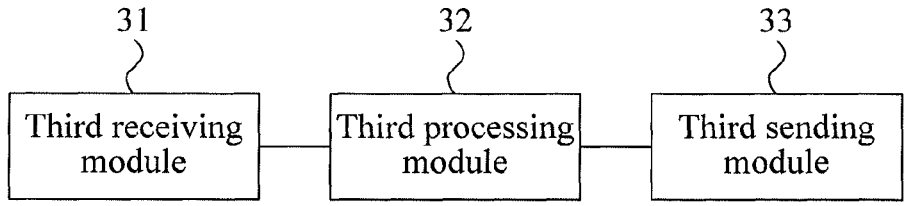
FIG. 12 is a schematic structure diagram of Embodiment 4 of a search server according to the present invention.

FIG. 12 is a schematic structure diagram of Embodiment 4 of a search server according to the present invention. As shown in FIG. 12, the search server according to this embodiment may include: a third receiving module 31, a third processing module 32, and a third sending module 33. The third receiving module 31 is configured to receive a search request sent by a search application server, where the search request carries keyword information to be searched for, and an instant interest model and a long-term interest model acquired by the search application server; and receive search result information acquired by a member engine by searching according to the keyword information. The third processing module 32 is configured to perform scoring and sorting processing on the search result information according to the instant interest model and the long-term interest model. The third sending module 33 is configured to send the search result information after the scoring and sorting processing and corresponding score information to the search application server.

The implementation principle of the search server according to this embodiment is the same as the implementation principle of Embodiment 6 of the method, and is not repeated herein.

In this embodiment, the search server may perform the scoring and sorting processing on the search result information fed back by the member engine according to the instant interest model and the long-term interest model of a user, so as to provide the user with the personalized search result information that meets demands of the user and has high matching accuracy.

Figure 13:
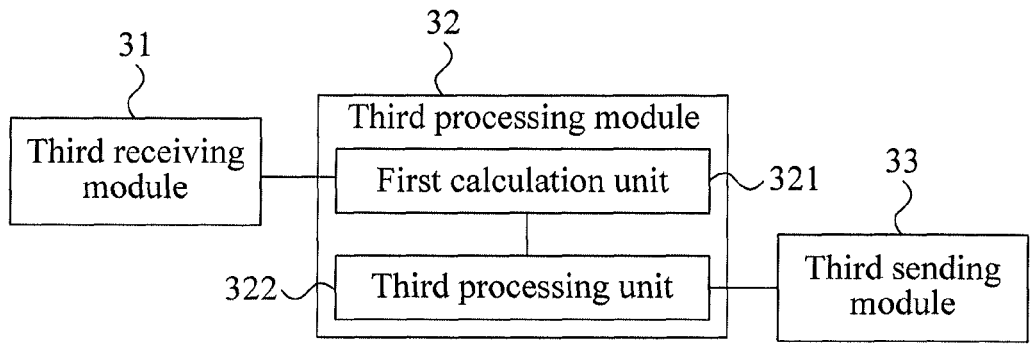
FIG. 13 is a schematic structure diagram of Embodiment 5 of a search server according to the present invention.

FIG. 13 is a schematic structure diagram of Embodiment 5 of a search server according to the present invention. As shown in FIG. 13, in the search server according to this embodiment based on the search server shown in FIG. 12, the third processing module 32 may include: a third calculation unit 321 and a third processing unit 322. The third calculation unit 321 is configured to calculate a first similarity between an instant interest model and search result information, and calculate a second similarity between a long-term interest model and the search result information. The third processing unit 322 is configured to acquire a score value according to the first similarity and the second similarity, and perform sorting processing on the search result information according to the score value.

The implementation principle of the search server according to this embodiment is the same as the implementation principle of Embodiment 7 of the method, and is not repeated herein.

In this embodiment, the search server may perform the scoring and sorting processing on the search result information fed back by the member engine according to the instant interest model and the long-term interest model of a user, so as to provide the user with the personalized search result information that meets demands of the user and has high matching accuracy.

Figure 14:
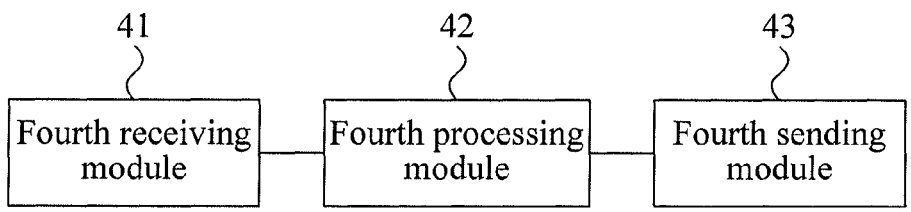
FIG. 14 is a schematic structure diagram of Embodiment 1 of a member engine device according to the present invention.

FIG. 14 is a schematic structure diagram of Embodiment 1 of a member engine device according to the present invention. As shown in FIG. 14, the member engine device according to this embodiment may include: a fourth receiving module 41, a fourth processing module 42, and a fourth sending module 43. The fourth receiving module 41 is configured to receive a search request, where the search request carries keyword information to be searched for, an instant interest model, and a long-term interest model. The fourth processing module 42 is configured to search for the keyword information according to the search request, acquire search result information, and perform scoring and sorting processing on the search result information according to the instant interest model and the long-term interest model. The fourth sending module 43 is configured to return the search result information after the scoring and sorting processing.

The implementation principle of the member engine device according to this embodiment is the same as the implementation principle of Embodiment 4 of the method, and is not repeated herein.

In this embodiment, the member engine device may receive the instant interest model and the long-term interest model sent by a search server, so as to perform the personalized scoring processing on the search result information according to the instant interest model and the long-term interest model of a user after acquiring the search result information corresponding to the keyword information, thereby acquiring the score information corresponding to each piece of the search result information and the personalized search result information that meets demands of the user and has high matching accuracy.

Figure 15:
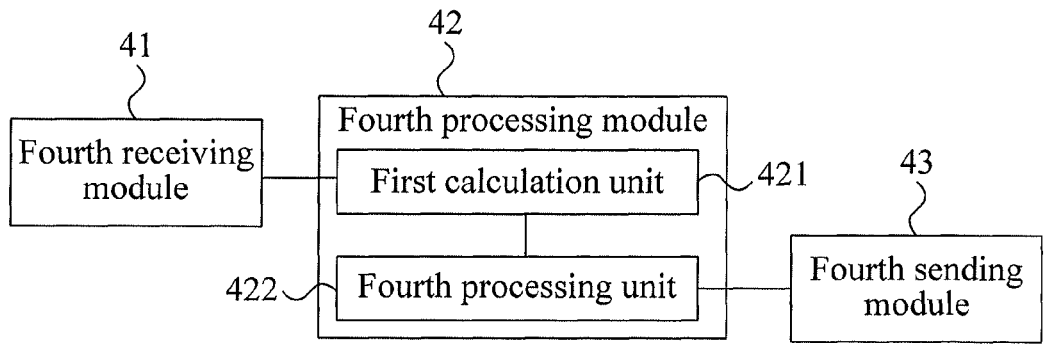
FIG. 15 is a schematic structure diagram of Embodiment 2 of a member engine device according to the present invention.

FIG. 15 is a schematic structure diagram of Embodiment 2 of a member engine device according to the present invention. As shown in FIG. 15, based on the member engine device shown in FIG. 14 in the member engine device according to this embodiment, the fourth processing module 42 may include: a fourth calculation unit 421 and a fourth processing unit 422. The fourth calculation unit 421 is configured to calculate a first similarity between an instant interest model and search result information, and calculate a second similarity between a long-term interest model and search result information. The fourth processing unit 422 is configured to acquire a score value according to the first similarity and the second similarity, and perform sorting processing on the search result information according to the score value.

The implementation principle of the member engine device according to this embodiment is the same as the implementation principle of Embodiment 4 and Embodiment 5 of the method, and is not repeated herein.

In this embodiment, the member engine device may receive the instant interest model and the long-term interest model sent by a search server, so as to perform the personalized scoring processing on the search result information according to the instant interest model and the long-term interest model of a user after acquiring the search result information corresponding to the keyword information, thereby acquiring the score information corresponding to each piece of the search result information and the personalized search result information that meets demands of the user and has high matching accuracy.

Figure 16:
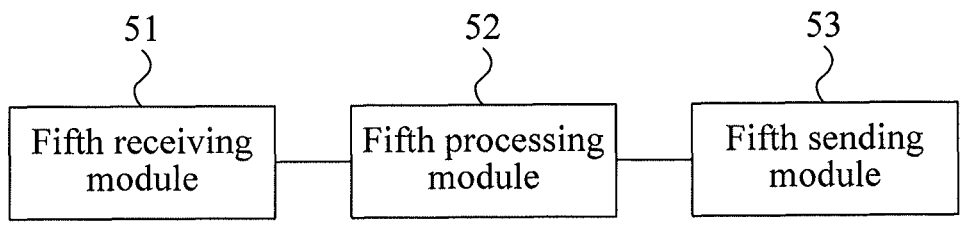
FIG. 16 is a schematic structure diagram of an embodiment of a search application server according to the present invention.

FIG. 16 is a schematic structure diagram of an embodiment of a search application server of the present invention. As shown in FIG. 16, the search application server according to this embodiment may include: a fifth receiving module 51, a fifth processing module 52, and a fifth sending module 53. The fifth receiving module 51 is configured to receive a search request message sent by a search client. The search request message carries keyword information. The fifth processing module 52 is configured to extract an instant interest model and a long-term interest model from a user database. The fifth sending module 53 is configured to send a search request to a search server. The search request carries the keyword information, the instant interest model, and the long-term interest model, so that the search server searches for the keyword information according to the instant interest model and the long-term interest model.

In addition, the fifth processing module 52 is specifically configured to use a CRF model to calculate a conditional probability of an output type of a current query q(t) when a query sequence q(1), . . . , q(t−1), q(t) in the same search context session of the current query q(t) is given. A conditional probability value is used as a score value of an interest dimension of the instant interest model corresponding to the output type.

The implementation principle of the search application server according to this embodiment is the same as the implementation principle of Embodiment 8 of the method, and is not repeated herein.

In this embodiment, the search application server extracts the instant interest model and the long-term interest model of a user, so that the search server can perform the corresponding searching according to the instant interest model and the long-term interest model of the user, thereby providing the user with the personalized search result information that meets demands of the user and has high matching accuracy.

Figure 17:
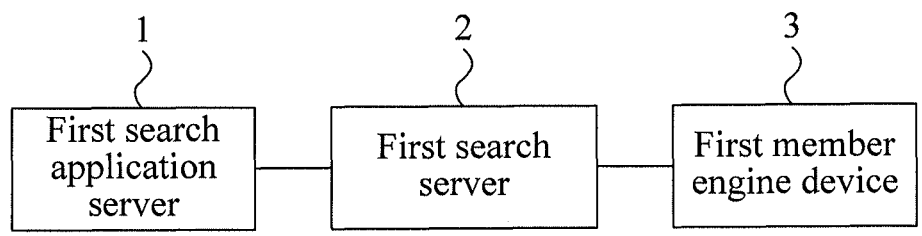
FIG. 17 is a schematic structure diagram of Embodiment 1 of a system for mobile search according to the present invention.

FIG. 17 is a schematic structure diagram of Embodiment 1 of a system for mobile search according to the present invention. As shown in FIG. 17, the system according to this embodiment may include: a first search application server 1, a first search server 2, and a first member engine device 3. The first search application server 1 is configured to receive a search request message sent by a search client, where the search request message carries keyword information; extract an instant interest model and a long-term interest model from a user database; and send a search request to the first search server 2, where the search request carries the keyword information, the instant interest model, and the long-term interest model. The first search server 2 is configured to receive the search request sent by the first search application server 1, where the search request carries the keyword information to be searched for, and the instant interest model and the long-term interest model acquired by the first search application server 1, calculate a relevance score value of each member engine according to the keyword information, meta index information of the member engine, the instant interest model, and the long-term interest model, and select one or more member engines from the first member engine device 3 according to the relevance score value to search for the keyword information. The first member engine device 3 is configured to receive the search request sent by the first search server 2, search for the keyword information, and send search result information to the first search server 2, so that the first search server 2 feeds back the search result information to the search client through the first search application server 1.

In the system for mobile search according to this embodiment, before requesting the first member engine device to search for the keyword information, the first search server may perform selection on the first member engine device according to the instant interest model and the long-term interest model of a user sent by the first search application server, so that the member engine, in the first member engine device, matching the keyword information to be searched for, the instant interest model, and the long-term interest model can be selected and acquired to search for the keyword information, and accurate search result information can be acquired, thereby further meeting a search demand of the user.

Figure 18:
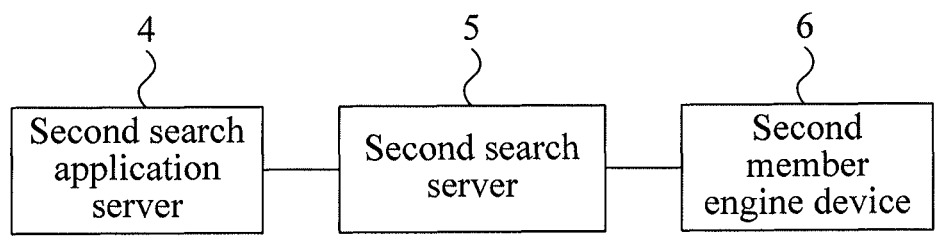
FIG. 18 is a schematic structure diagram of Embodiment 2 of a system for mobile search according to the present invention.

FIG. 18 is a schematic structure diagram of Embodiment 2 of a system for mobile search according to the present invention. As shown in FIG. 18, the system according to this embodiment may include: a second search application server 4, a second search server 5, and a second member engine device 6. The second search application server 4 is configured to receive a search request message sent by a search client, where the search request message carries keyword information; extract an instant interest model and a long-term interest model from a user database; and send a search request to the second search server 5, where the search request carries the keyword information, the instant interest model, and the long-term interest model. The second search server 5 is configured to send the search request to the second member engine device 6, where the search request carries the keyword information to be searched for, and the instant interest model and the long-term interest model acquired by the second search application server 4; receive search result information and score information corresponding to the search result information fed back by the second member engine device 6; re-score and sort the search result information according to the score information and information of relevant factors to acquire the search result information after re-scoring and sorting, and send the search result information after re-scoring and sorting to the second search application server 4. The second member engine device 6 is configured to receive the search request sent by the second search server 5, search for the keyword information, acquire the search result information according to the instant interest model and the long-term interest model and the score information corresponding to the search result information, and send the search result information and the score information to the second search server 5.

In the system for mobile search according to this embodiment, the second search server may send the instant interest model and the long-term interest model extracted by the second search application server to the second member engine device, so that after the second member engine device acquires the search result information, the second member engine device may perform the personalized scoring processing on the search result information according to the instant interest model and the long-term interest model of the user, so as to acquire the score information corresponding to each piece of the search result information. After receiving the search result information and the corresponding score information fed back by the second member engine device, the second search server may further re-score and sort the search result information in combination with other relevant factors, so as to acquire the personalized search result information that meets demands of the user and has high matching accuracy.

Figure 19:
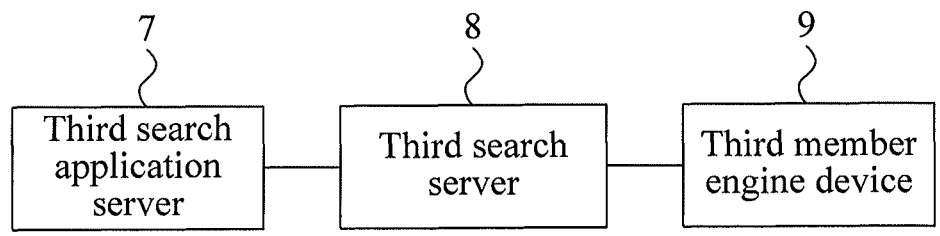
FIG. 19 is a schematic structure diagram of Embodiment 3 of a system for mobile search according to the present invention.

FIG. 19 is a schematic structure diagram of Embodiment 3 of a system for mobile search according to the present invention. As shown in FIG. 19, the system according to this embodiment may include a third search application server 7, a third search server 8, and a third member engine device 9. The third search application server 7 is configured to receive a search request message sent by a search client, where the search request message carries keyword information; extract an instant interest model and a long-term interest model from a user database; and send a search request to the third search server 8, where the search request caries the keyword information, the instant interest model, and the long-term interest model. The third search server 8 is configured to receive the search request sent by the third search application server 7, where the search request carries the keyword information to be searched for, and the instant interest model and the long-term interest model acquired by the search application server, receive the search result information acquired by the third member engine device 9 by searching according to the keyword information, perform scoring and sorting processing on the search result information according to the instant interest model and the long-term interest model, and send the search result information after the scoring and sorting processing and corresponding score information to the third search application server 7. The third member engine device 9 is configured to receive the search request sent by the third search server 8, search for the keyword information, and acquire the search result information.

In the system for mobile search according to this embodiment, the third search server may perform the scoring and sorting processing on the search result information fed back by the third member engine device according to the instant interest model and the long-term interest model of a user extracted by the third search application server, so as to provide the user with the personalized search result information that meets demands of the user and has high matching accuracy.

For all interactions between the units and relevant information according to the embodiments of the apparatuses, servers, and systems of the present invention, the aforementioned relevant processes according to the embodiments of the method may be referred to, and specific functions and processes may be obtained with reference to the aforementioned embodiments, which are not repeated herein.

Through the above description of the implementation, it is apparent to persons of ordinary skill in the art that the present invention may be implemented through hardware plus a necessary universal hardware platform, or through software. But in many cases, the present invention is preferably implemented through the former method. Based on this, the technical solutions of the present invention or the part that makes contributions to the prior art can be substantially embodied in the form of a software product. The computer software product is stored in a readable storage medium such as a floppy disk, a hard disk, or an optical disk of a computer, and contains several instructions to instruct computer device (for example, a personal computer, a server, or network device) to perform the method described in the embodiments of the present invention.

Finally, it should be noted that the above embodiments are merely provided for describing the technical solutions of the present invention, but not intended to limit the present invention. It should be understood by persons of ordinary skill in the art that although the present invention has been described in detail with reference to the foregoing embodiments, modifications can be made to the technical solutions described in the foregoing embodiments, or equivalent replacements can be made to some technical features in the technical solutions, as long as such modifications or replacements do not cause the essence of corresponding technical solutions to depart from the spirit and scope of the present invention.

What is claimed is:

1. A method for performing mobile search utilizing a plurality of member engines, comprising:
receiving a search request by a search server, wherein the search request carries: keyword information to be searched for, and an instant interest model of a user associated with the search request and a long-term interest model of the user which are acquired by a search application server, wherein:
the instant interest model of the user is an instant interest model vector formed by score values of N dimensions, wherein:
the score value of each of the N dimensions indicates an interest level of the user on said each of the N dimensions, and is calculated according to relevant data of a query sequence q(1), . . . , q(t-1), q(t) in a same search context session initiated by the user, wherein:
the same search context session corresponds to the search request, and the search context session comprises a sum of a period of preset time before the current query q(t) occurs and a time when the current query q(t) occurs;
calculating by the search server, a relevance score value of each member engine utilizing: the search request, meta index information describing stored contents of the member engine, the instant interest model of the user, and the long-term interest model of the user; and
selecting by the search server, one or more member engines to search for the keyword information according to the relevance score value.

2. The method for mobile search according to claim 1, wherein the long-term interest model is a long-term interest model vector formed by score values of N dimensions, and the score value of each of the dimensions is calculated according to search history data and a static profile of a user.

3. The method for mobile search according to claim 1, wherein the calculating the relevance score value of each of the member engines according to meta index information of the member engine, the instant interest model, and the long-term interest model comprises:
calculating a first maximum similarity between the keyword information and the meta index information of the member engine;
calculating a second maximum similarity between the meta index information of the member engine and the instant interest model based on that a similarity between the meta index information of the member engine and the keyword information is greater than a first threshold value and a similarity between the meta index information of the member engine and the long-term interest model is greater than a second threshold value;

calculating a third maximum similarity between the meta index information of the member engine and the long-term interest model based on that the similarity between the meta index information of the member engine and the keyword information is greater than a third threshold value and a similarity between the meta index information of the member engine and the instant interest model is greater than a fourth threshold value;

calculating a fourth maximum similarity between the meta index information of the member engine and a resulting vector of a weighted sum of the long-term interest model and the instant interest model based on that the similarity between the meta index information of the member engine and the keyword information is greater than a fifth threshold value; and calculating a similarity score value of the member engine according to the first maximum similarity, the second maximum similarity, the third maximum similarity, and the fourth maximum similarity.

4. The method for mobile search according to claim 3, wherein the calculating the similarity score value of the member engine according to the first maximum similarity, the second maximum similarity, the third maximum similarity, and the fourth maximum similarity comprises:

acquiring the similarity score value by adding up the first maximum similarity, the second maximum similarity, the third maximum similarity, and the fourth maximum similarity in a weighted manner, or by multiplying the first maximum similarity by the second maximum similarity, the third maximum similarity, and the fourth maximum similarity, or by acquiring a maximum value among the first maximum similarity, the second maximum similarity, the third maximum similarity, and the fourth maximum similarity.

5. A search server, comprising a processor; and a memory coupled to the processor and having multiple computer executable instructions stored thereon, the processor being configured to execute the computer executable to:

receive a search request, wherein the search request carries: keyword information to be searched for, and an instant interest model of a user associated with the search request and a long-term interest model of the user which are acquired by a search application server, wherein:

the instant interest model of the user is an instant interest model vector formed by score values of N dimensions, wherein:

the score value of each of the N dimensions indicates an interest level of the user on said each of N dimensions, and is calculated according to relevant data of a query sequence $q(1), \ldots, q(t-1), q(t)$ in a same search context session initiated by the user, wherein:

the same search context session corresponds to the search request, and the search context session comprises a sum of a period of preset time before the current query $q(t)$ occurs and a time when the current query $q(t)$ occurs;

calculate a relevance score value of each member engine utilizing: the search request, meta index information describing stored contents of the member engine, the instant interest model, and the long-term interest model; and select one or more member engines to search for the keyword information according to the relevance score value.

6. The search server according to claim 5, wherein the processor is further configured to:

calculate a first maximum similarity between the keyword information and the meta index information of the member engine; calculate a second maximum similarity between the meta index information of the member engine and the instant interest model based on that a similarity between the meta index information of the member engine and the keyword information is greater than a first threshold value and a similarity between the meta index information of the member engine and the long-term interest model is greater than a second threshold value; calculate a third maximum similarity between the meta index information of the member engine and the long-term interest model based on that the similarity between the meta index information of the member engine and the keyword information is greater than a third threshold value and a similarity between the meta index information of the member engine and the instant interest model is greater than a fourth threshold value; and calculate a fourth maximum similarity between the meta index information of the member engine and a resulting vector of a weighted sum of the long-term interest model and the instant interest model based on that the similarity between the meta index information of the member engine and the keyword information is greater than a fifth threshold value; and calculate a similarity score value of the member engine according to the first maximum similarity, the second maximum similarity, the third maximum similarity, and the fourth maximum similarity.

\* \* \* \* \*